(12) United States Patent
Albrecht et al.

(10) Patent No.: US 7,945,880 B1
(45) Date of Patent: May 17, 2011

(54) CONSTRAINT BASED RETIMING OF SYNCHRONOUS CIRCUITS

(75) Inventors: Christoph Albrecht, Berkeley, CA (US); Sascha Richter, Munich (DE)

(73) Assignee: Cadence Design Systems, Inc., San Jose, CA (US)

( * ) Notice: Subject to any disclaimer, the term of this patent is extended or adjusted under 35 U.S.C. 154(b) by 960 days.

(21) Appl. No.: 11/755,425

(22) Filed: May 30, 2007

(51) Int. Cl.
G06F 17/50 (2006.01)
G06F 9/45 (2006.01)

(52) U.S. Cl. ........ 716/105; 716/101; 716/103; 716/106; 716/108; 716/109; 716/110; 716/113; 716/117

(58) Field of Classification Search .................. 716/1, 2, 716/6, 10, 11, 18
See application file for complete search history.

(56) References Cited

U.S. PATENT DOCUMENTS

| | | | | | |
|---|---|---|---|---|---|
| 5,822,217 | A | * | 10/1998 | Shenoy | 716/6 |
| 6,473,890 | B1 | * | 10/2002 | Yasui et al. | 716/10 |
| 6,941,541 | B2 | * | 9/2005 | Snider | 716/18 |
| 7,007,262 | B2 | * | 2/2006 | Kurokawa et al. | 716/18 |
| 7,120,883 | B1 | * | 10/2006 | van Antwerpen et al. | 716/6 |
| 7,302,657 | B2 | * | 11/2007 | Lindkvist | 716/6 |
| 7,464,286 | B1 | * | 12/2008 | Singh et al. | 713/503 |
| 7,559,040 | B1 | * | 7/2009 | Albrecht et al. | 716/2 |
| 7,624,364 | B2 | * | 11/2009 | Albrecht et al. | 716/6 |
| 7,689,955 | B1 | * | 3/2010 | van Antwerpen et al. | 716/6 |
| 7,739,642 | B2 | * | 6/2010 | Albrecht | 716/6 |
| 7,743,354 | B2 | * | 6/2010 | Albrecht et al. | 716/6 |
| 2008/0276209 | A1 | * | 11/2008 | Albrecht et al. | 716/6 |
| 2009/0293032 | A1 | * | 11/2009 | Oktem | 716/6 |
| 2010/0115477 | A1 | * | 5/2010 | Albrecht et al. | 716/2 |

OTHER PUBLICATIONS

Liu et al.; "Data flow partitioning with clock period and latency constraints"; Publication Year: 1997; Circuits and Systems I: Fundamental Theory and Applications, IEEE Transactions on; vol. 44, Issue: 3; pp. 210-220.*
O'Neil et al.; "Retiming synchronous data-flow graphs to reduce execution time"; Publication Year: 2001; Signal Processing, IEEE Transactions on; vol. 49, Issue: 10; pp. 2397-2407.*
Ekpanyapong et al.; "Statistical Bellman-Ford algorithm with an application to retiming"; Publication Year: 2006; Design Automation, 2006. Asia and South Pacific Conference on.*
Chu et al.; "Retiming with interconnect and gate delay"; Publication Year: 2003; Computer Aided Design, ICCAD-2003; International Conference on; , pp. 221-226.*
Touati, H. ; Brayton, R.. Computing the Initial States of Retimed Circuits. IEEE Transactions on Computer-Aided Design of Integrated Circuits and Systems. Jan. 1993. 157-162. vol. 12.

(Continued)

Primary Examiner — Helen Rossoshek
(74) Attorney, Agent, or Firm — Alford Law Group, Inc.; William E. Alford

(57) ABSTRACT

In one embodiment of the invention, a method of retiming a circuit is disclosed. The method includes computing an upper bound and a lower bound for a clock period of a clock signal to clock a circuit in response to a netlist of the circuit; selecting a potential clock period for the clock signal to clock registers of the circuit in response to the computed upper bound and the computed lower bound for the clock period; computing an upper bound and a lower bound of a retiming value for each node of the circuit to determine if a retiming of the circuit is achievable with the potential clock period; and computing the retiming value for each node of the circuit to minimize circuit area in response to the computed upper bound and the computed lower bound of the retiming value for each node.

27 Claims, 11 Drawing Sheets

OTHER PUBLICATIONS

Eckly, K. ; Madre, J. ; Zepter, P. ; Legl, C. A Practical Approach to Multiple-Class Retiming. 1999. 1-6. ACM, New Orleans, Louisiana.

Leiserson, C. ; Saxe, J. ; Retiming Synchronous Circuitry. 1991. 5-35. Springer-Verlag New York Inc.

Maheshwari, N. ; Sapatnekar, S. Retiming Control Logic. Elsevier Science, Amsterdam 1-20. 1999.

Maheshwari, N. ; Sapatnekar, S. Efficient Retiming of Large Circuits. IEEE Transactions on Very Large Scale Integration Systems. Mar. 1998. 74-83. vol. 6.

Pan, P. Continuous Retiming: Algorithms and Applications. 1997.1-6. ICCD.

Papaefthymiou, M. Understanding Retiming through Maximum Average-Delay Cycles. Mathematical Systems Theory. No. 27. 1-22. 1994.

Sapatnekar, S. ; Deokar, R. Utilizing the Retiming-Skew Equivalence in a Practical Algorithm for Retiming Large Circuits.IEEE Transactions on Computer-Aided Design of Integrated Circuits and Systems. 1996. 1237-1248. vol. 15.

Shenoy, N. ; Rudell, R. Efficient Implementation of Retiming. 226-233. 1994. ACM.

Legl, C. ; Vanbekbergen, P. ; Wang, A. Retiming of Edge-Triggered Circuits with Multiple Clocka and Load Enables. May 1997. 1-4. Tahoe City, CA.

* cited by examiner

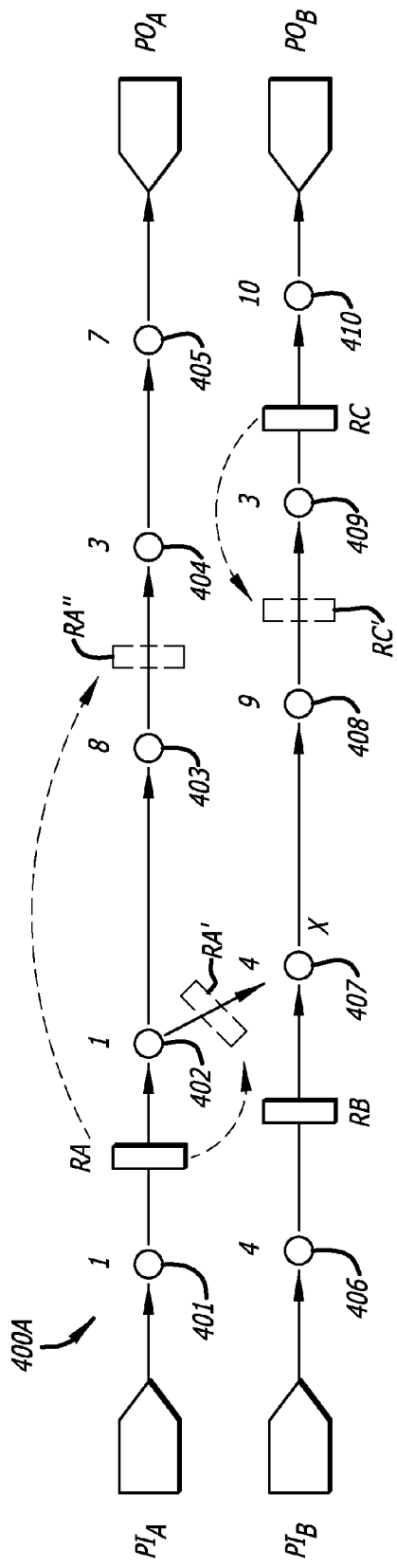
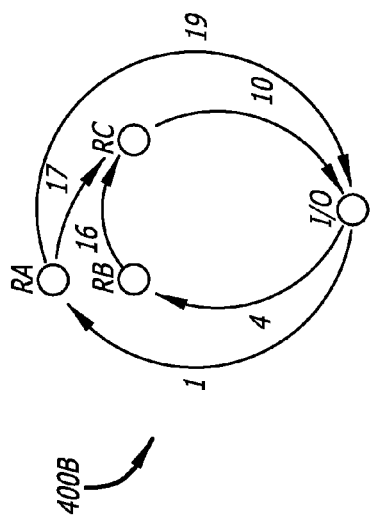
FIG. 4A
FIG. 4B

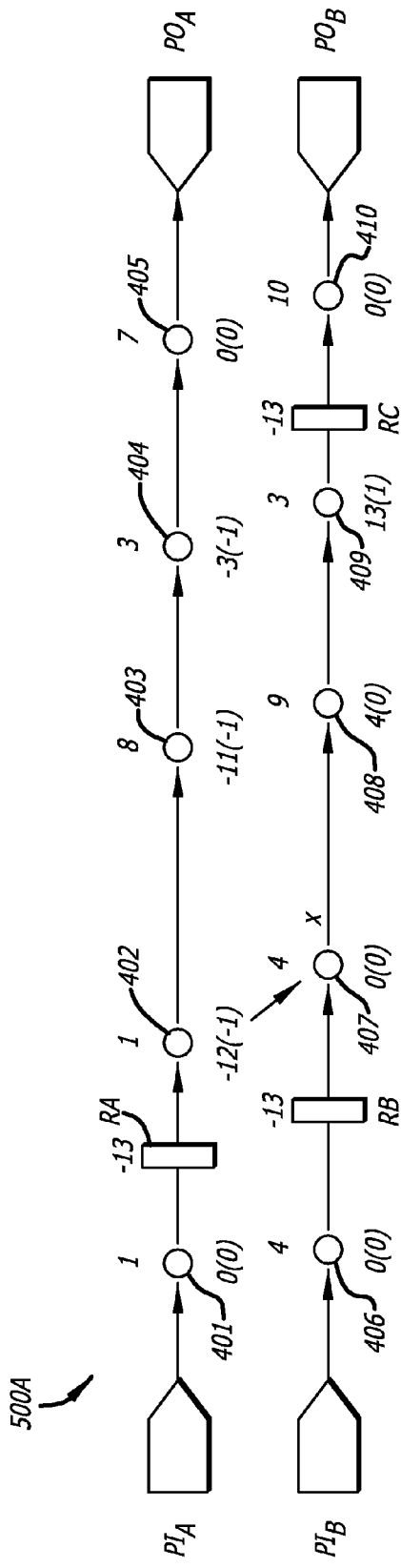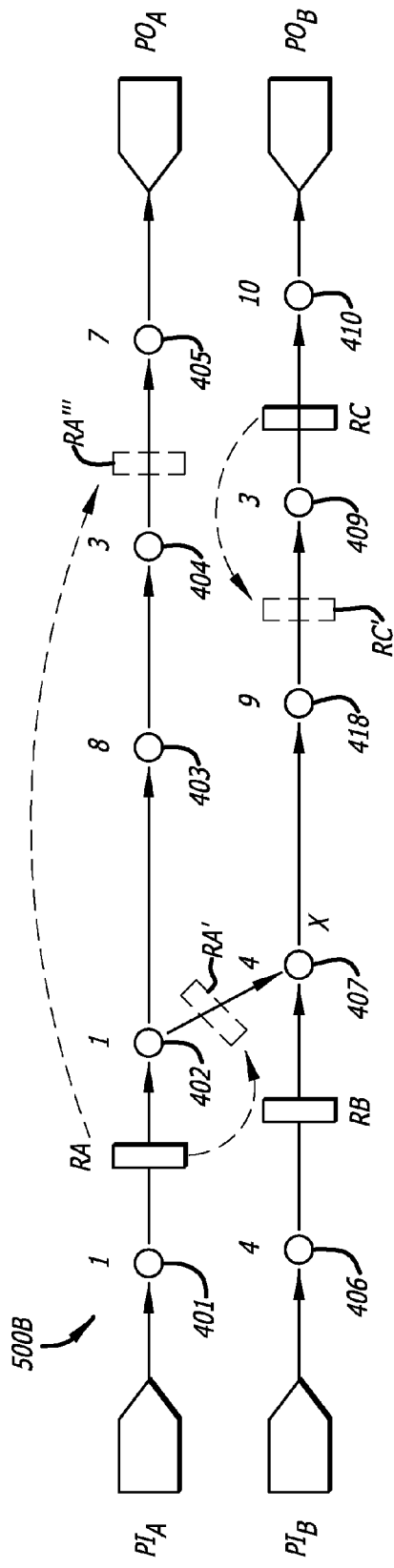
FIG. 5A
FIG. 5B

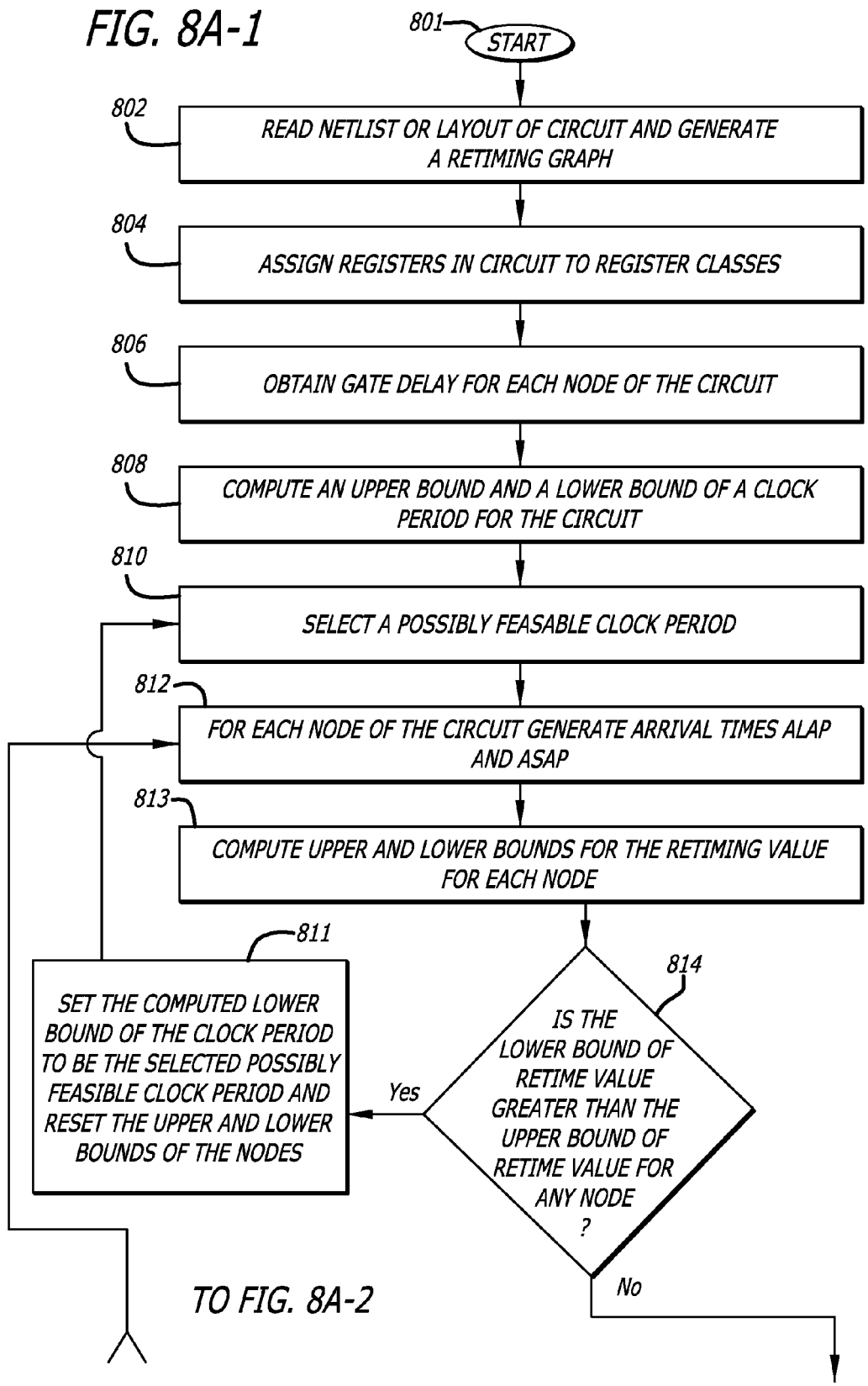

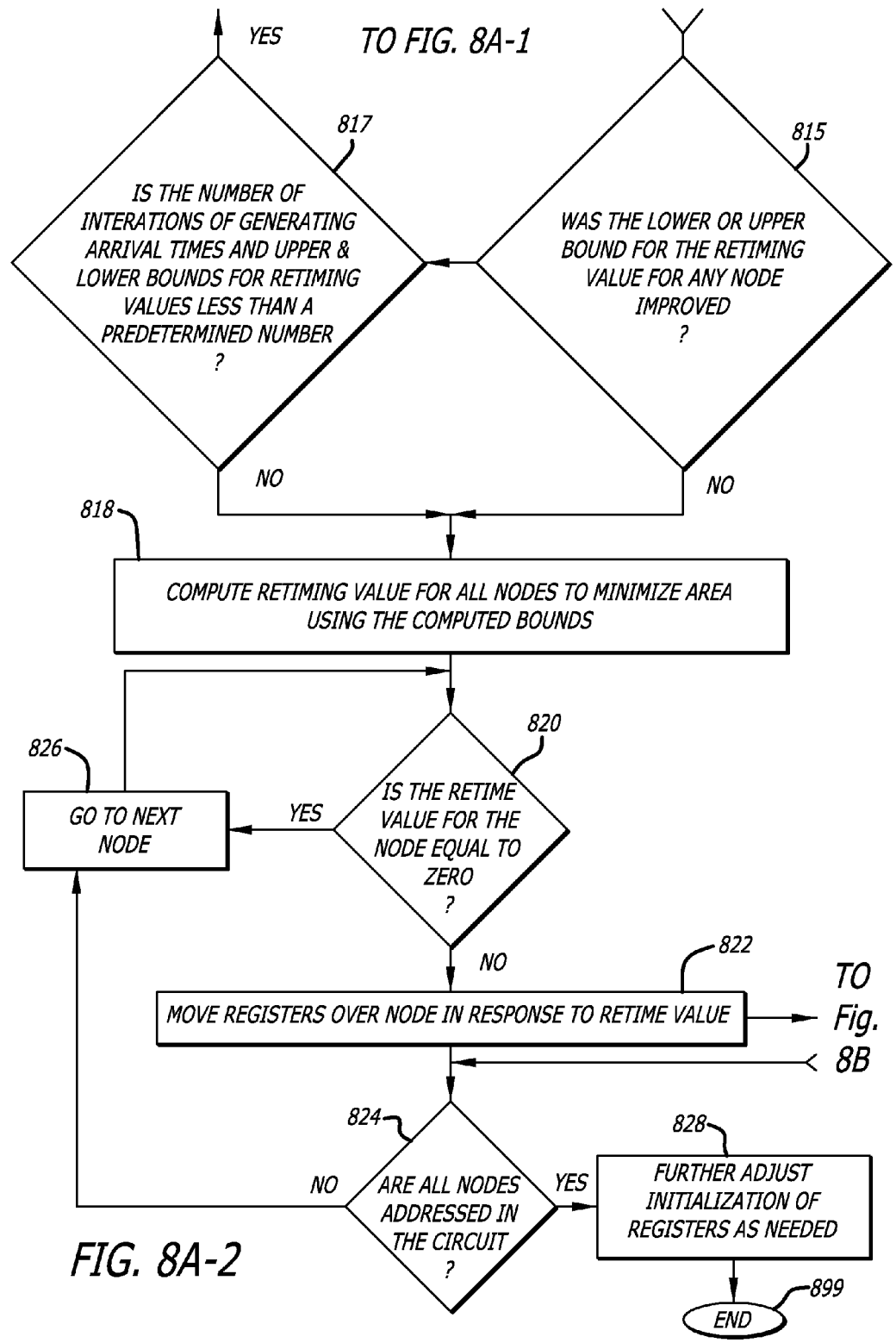

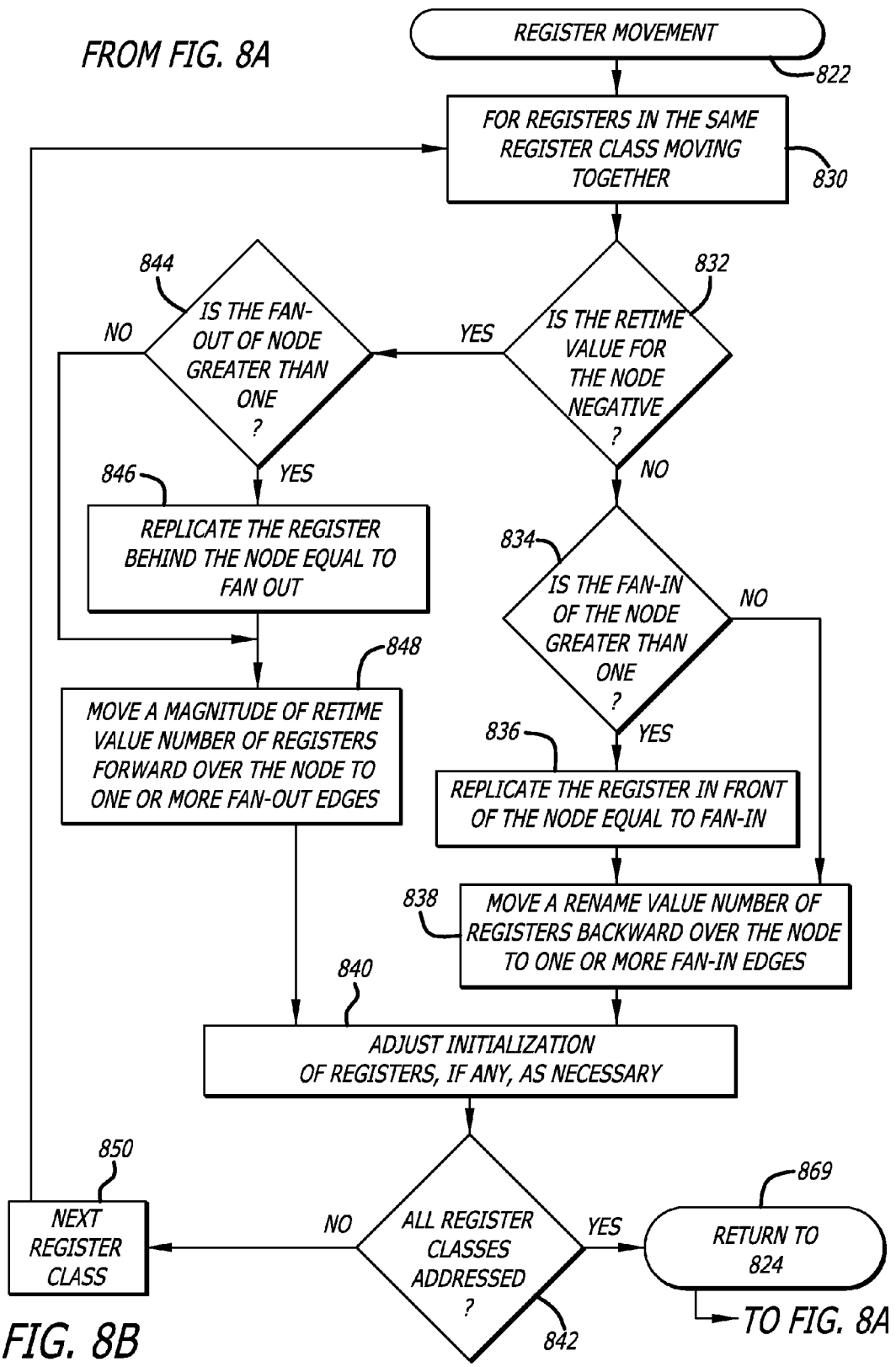

CONSTRAINT BASED RETIMING OF SYNCHRONOUS CIRCUITS

FIELD

The embodiments of the invention relate generally to retiming integrated circuit netlists during logic synthesis. More particularly, the embodiments of the invention relate to constraint based retiming with boundaries to maximize forward movement of flip-flops.

BACKGROUND

During logic synthesis, logic cells from a cell library are mapped into a netlist to begin the physical design process of an integrated circuit. In order that logical computations can be made within a given clock period, logic gates in a data path are often separated by D-type flip flops during the logic synthesis process. Oftentimes the logic gates are conservatively placed between D-type flip flops such that the timing delays can easily beat out the given clock period. However, this leads to overly conservative designs that are not area efficient. Retiming the logic gates in a data path by moving the flip flops forward or backward to eliminate one or more flip flops can conserve area in an integrated circuit design that can lead to a reduced die size with reduced manufacturing costs.

It is also difficult to predict the delay of logic gates that realize a logic function. In this case, retiming is used to improve the performance (e.g., cycle time) of the integrated circuits.

As integrated circuits have become more complex, it has become more difficult to perform retiming, requiring additional time to complete the retiming process in the design flow of integrated circuits.

It is desirable to improve the efficiency of the retiming process so that it is performed more quickly to improve productivity of the integrated circuit design process.

BRIEF SUMMARY

The embodiments of the invention are summarized by the claims that follow below.

BRIEF DESCRIPTIONS OF THE DRAWINGS

FIG. 4A is an exemplary bounds retiming graph to illustrate circuit retiming.

FIG. 4B is an exemplary register-to-register graph.

FIGS. 5A-5B are exemplary retiming graphs with possible arrival times and retiming values for each node being illustrated in FIG. 5A.

FIGS. 8A-8B are flow charts illustrating a method of circuit retiming in accordance with embodiments of the invention.

DETAILED DESCRIPTION

Figure 1:
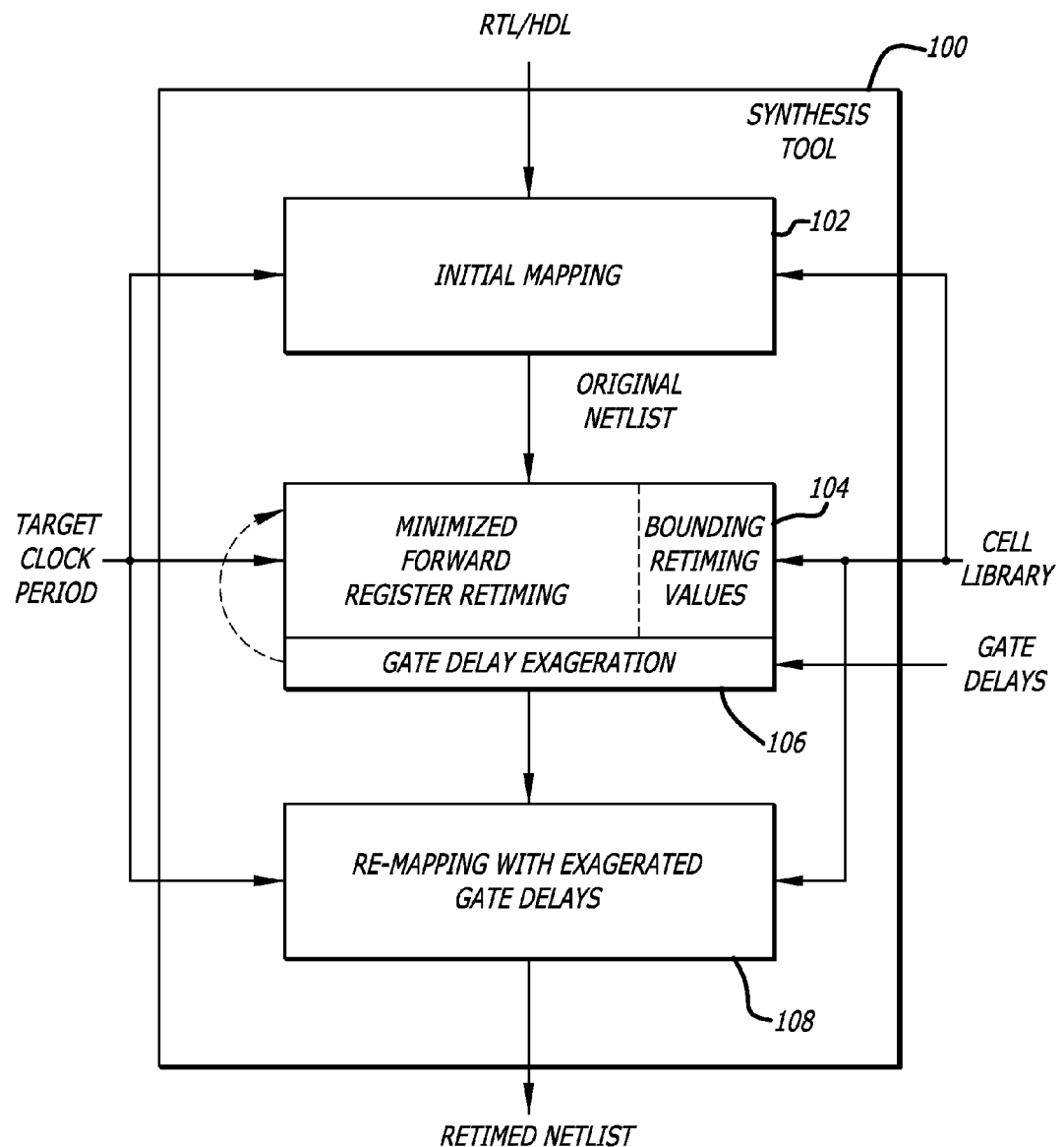
FIG. 1 is a block diagram of a synthesis tool in accordance with an embodiment of the invention.

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for constraint based retiming of synchronous circuits.

Introduction

Retiming is a structural netlist transformation which moves registers forward and backward in the logic. Retiming has the objective to (1) minimize the clock period and to (2) minimize the number of registers either for the minimum clock period achievable by retiming or for a given clock period.

Registers can have different control signals and may also have initial states (reset line). Registers which have different control signals cannot be combined when they are moved forward (in the direction of the signal propagation) or backward over a gate. Similarly, registers with initial states cannot be moved backward over a gate if the justification problem does not have a solution. This leads to a constrained retiming problem. For each node in a retiming graph, what are the constraints on the number of flops which can be moved forward or backward over the respective node.

The question whether a retiming for a given clock period exists and how a retiming minimizes the number of registers can be answered by formulating and solving a network flow problem.

The minimum clock period which can be achieved by retiming is found by a binary search over the clock period and a successive check if a clock period is feasible. Generating the network flow problem for the feasibility test and for minimizing the register count is the most CPU intensive part. Hence, it is important to have a good lower and upper bound on the clock period.

A first embodiment of the invention is a methodology to compute lower and upper bounds of the clock period where the difference between the lower and upper bound is substantially at most the maximum delay of a gate. That is, constraints are considered when computing retiming values to quickly determine a solution. The first embodiment of the invention addresses the problem of efficiently computing a good lower and upper bound on the clock period achievable for the constrained retiming problem. Good lower and upper bounds on the clock period are important to efficiently find the minimum clock period which can be realized by retiming.

As previously mentioned, the problem of finding a retiming that minimizes the number of registers for a given clock period can be formulated and solved as a network flow problem. It is possible to bound the retiming values of nodes and determine that the retiming values of some nodes are fixed by solving the clock scheduling problem with clock latencies as large as possible (ALAP) and with clock latencies as small as possible (ASAP). The clock latency problem computes latencies of the clock signal, that is, the delay from the clock root to the clock input of a register. The ALAP/ASAP approach is described in "Efficient retiming of large circuits", by N. Maheshwari and S. Sapatnekar, IEEE Transactions on Very Large Scale Integration (VLSI) Systems, vol. 6, pp 74-82, March 1998, which is incorporated herein by reference (referred to hereafter as "Maheshwari & Sapatnekar I"). The ALAP/ASAP approach may be incorporated into the embodiments of the invention to help to reduce the number of variables and constraints in the network flow problem and improve the runtime of a computer system.

A second embodiment of the invention iteratively uses the initial bounds of the retiming values to derive even stronger bounds for the retiming values of the nodes, that is, the number of registers moved backward over a node (negative number means forward). If the stronger bounds are infeasible for a given clock period, then the clock period cannot be realized by retiming. By using stronger bounds for the retiming values, more variables and constraints in the network flow formulation can be eliminated and runtime of logic synthesis can be further improved. The second embodiment of the invention iteratively bounds the retiming values of the nodes. It may be used to either determine that a given clock period cannot be achieved by retiming or to reduce the problem size of the network flow problem for minimizing the number of registers. This can both result in runtime improvements for the constrained retiming problem as well as the unconstrained retiming problem.

The embodiments of the invention may be incorporated into a number of electronic computer aided design (ECAD) software tools to perform circuit retiming.

Referring now to FIG. 1, a block diagram of exemplary software modules and their respective functions in a synthesis electronic computer aided design (ECAD) tool 100 is illustrated as one embodiment of the invention. The synthesis tool 100 is a software program includes software modules. One of the software modules of the synthesis tool is a mapper 102 to initially map a high level description (RTL/HDL) of an integrated circuit into an initial netlist using a target clock period and circuit cells of a cell library. A retimer 104 of the synthesis tool 100, retimes the netlist with minimized forward register retiming in response to the target clock period and the gate delays of the instantiated gates in the initial netlist and bounded retiming values. The retimer 104 may further exaggerate the gate delays of the instantiated cells with a gate delay exaggerator 106 before or after performing the retiming. The gate delay exaggerator 106 implements delay factors for the respective logic gates that are instantiated in the netlist. The delay factors for logic gates are further described below. A re-mapper 108 remaps the netlist with the exaggerated gate delays to generate the retimed netlist in response to the target clock period and the cells of the cell library.

Figure 2:
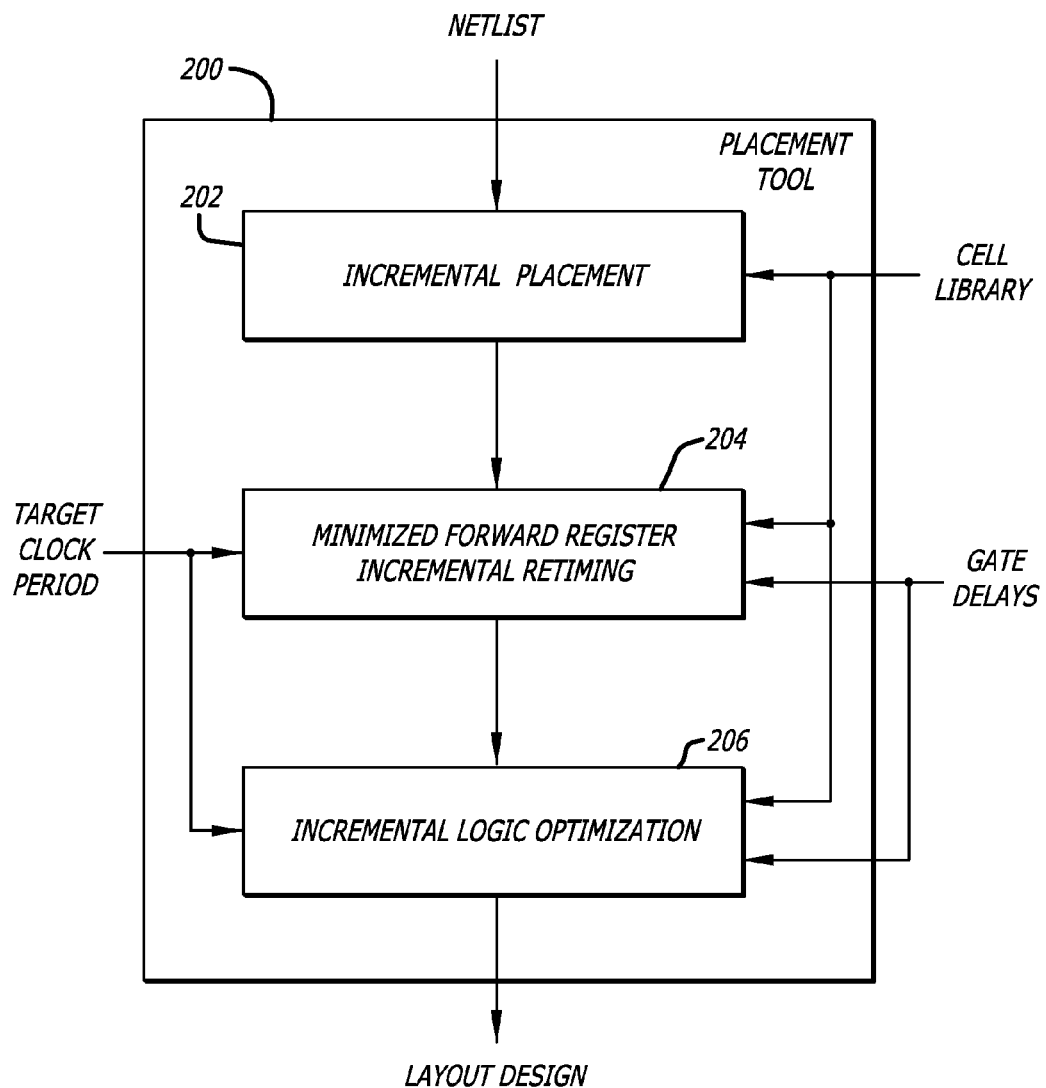
FIG. 2 is a block diagram of a placement tool in accordance with another embodiment of the invention.

Referring now to FIG. 2, a block diagram of exemplary software modules and their respective functions in a placement ECAD tool 200 is illustrated. The placement tool 200 includes a placer 202 to incrementally place cells of a cell library into a layout of the integrated circuit design in response to a netlist thereof. A retimer 204 of the placement tool 200 receives the layout and incrementally retimes the netlist with minimized forward register retiming in response to the target clock period and the gate delays of the gates placed into the layout and the bounded retiming values. A logic optimizer 206 of the placement tool 200 may incrementally optimize the layout design. For example, the logic optimizer 206 may resize an output buffer due to the parasitic impedance loading in order to meet timing requirements. Alternatively, the logic optimizer 206 may add a buffer to a node in order to meet the timing requirements and buffer a parasitic impedance load. The incremental logic optimization performed by the optimizer 206 is responsive to the target clock period, the instantiated layouts of the cells from the cell library, and the gate delays of the instantiated cells in the layout. The incremental placement, retiming, and optimization is repeated over and over again for sequential logic in data paths between registers for a functional block or a plurality of functional blocks in the integrated circuit design. That is, retiming is a global optimization technique.

In the embodiments of the invention, algorithms for performing retiming by the retimers are further described below.

Constrained Minimum Period and Minimum Area Retiming

Retiming is a powerful technique for delay and area minimization. The registers are moved forward and backward across logic gates. The technique was first proposed in "Optimizing Synchronous Systems" by C. Leiserson and J. Saxe, Journal of VLSI and Computer Systems, Vol. 1, pp 41-67, January 1983, and "Retiming synchronous Systems" by C. Leiserson and J. Saxe, Algorithmica, Vol. 6, pp 5-35, 1991, which are both incorporated herein by reference and referred to as "Leiserson and Saxe". Leiserson and Saxe considered two versions of the retiming problem. The first was a minimum period retiming problem in which the registers are relocated to minimize the clock period. The second was a minimum area retiming problem in which a target clock period is given and the registers are then relocated to minimize the total number of registers subject to the given clock period.

In practice registers have different control signals and initial states. This imposes additional constraints for the retiming problem. In this paper we consider the constrained minimum period and minimum area retiming problem in which the nodes of the retiming graph have lower and upper bounds on the retiming values which specify for each node how many registers can be moved forward or backward over a node.

To minimize the clock period it is important to have a good lower and upper bound on the clock period achievable by retiming.

A linear programming formulation is disclosed which takes constraints on the retiming value into account. This is fundamentally different from a clock scheduling problem as it does not work with a register-to-register graph but directly with a retiming graph.

For the unconstrained retiming problem, proofs are described herein to show that the optimal value of a linear program is a lower bound on the clock period achievable by retiming. Furthermore, the solution of the linear program can be used to compute a retiming which has a clock period not larger than the lower bound plus the maximum delay of all the gates. This solution to the linear program provides an upper bound on the clock period achievable by retiming.

Given a solution of the linear program, retiming values can be directly computed without having to iteratively move the registers to determine retiming. Moreover, special solutions of the linear programs may be used to derive bounds on the retiming values.

Retiming Algorithm

Referring now to FIG. 4A, a circuit can be modeled as an edge-weighted, node-weighted, directed (multi-) graph (referred to as a retiming circuit graph or simply as a retiming graph). The nodes are the primary inputs (PIs), the primary outputs (POs), and the logic gates of the circuit. FIG. 4A illustrates an exemplary retiming graph with primary inputs PIA and PIB, primary outputs POA and POB, registers A through C, and logic gates represented by circuit symbols. In a retiming graph, the interconnections between nodes are edges "e". For example, an edge between nodes u and v may be referenced by $e_{uv}$.

At a given node v representing a logic gate, there may be a number of gates coupled to the inputs of the node ("fanin") and a number of gates coupled to the output of the node ("fanout"). The fanin is represented by fanin edges and the function FI(v) represents the number of fanin edges of a node v. The fanout of a given node v is represented by fanout edges and the function FO(v) represents the number of fanout edges.

The nonnegative weight d(v) of a node v represents the propagation delay of the corresponding gate at the node. The weight $w(e_{uv})$ of an edge $e_{uv}$ is the number of registers on the interconnection between nodes.

Retiming a node may be achieved by a forward movement of registers in the same direction of signal propagation or a backward movement of registers opposite the direction of signal propagation. With backward movement of registers (also referred to as "backward register movement"), a retiming of a node by a value i is an operation that moves i registers from each fanout edge and adds i registers to each fanin edge of the node. We say the register is moved backward (opposite) and the value of i is positive. With a forward movement of registers (also referred to as "forward register movement"), a retiming of a node by a value i takes i registers from each fanin edge and adds i registers to each fanout edge of the node. A negative value of i indicates that registers are moved forward during retiming from the fanin edges of a node to the fanout edges of the node. In general the nodes in a circuit can be retimed collectively.

Figure 3A:
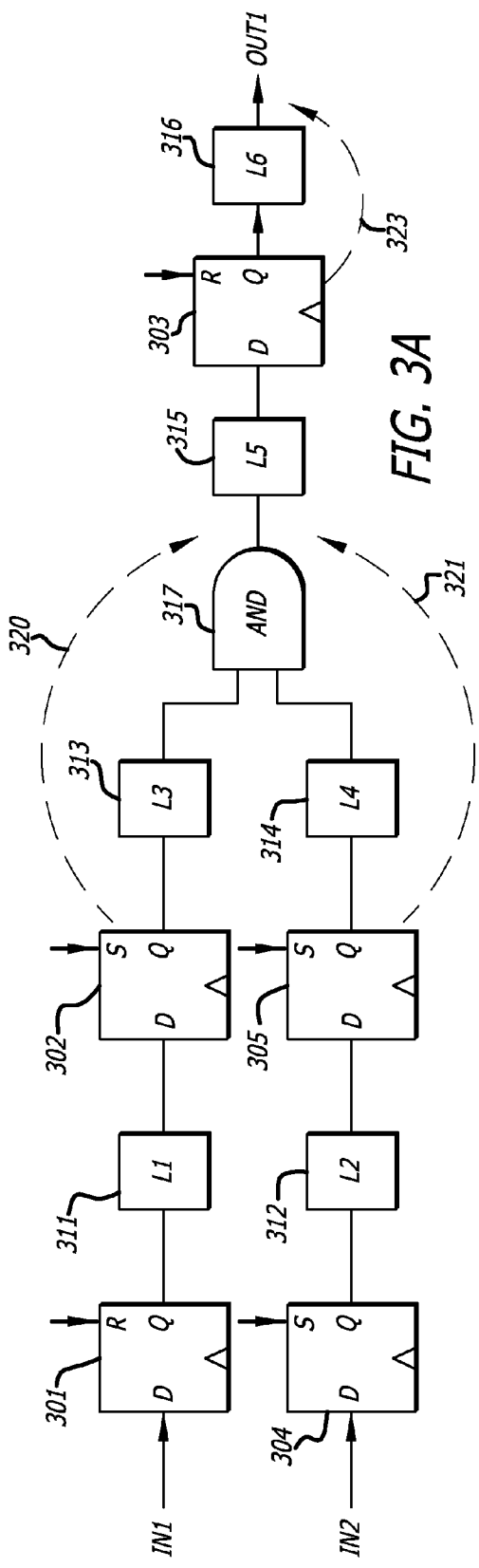
FIGS. 3A-3C are exemplary schematic circuit diagrams to illustrate circuit retiming.
Figure 3B:
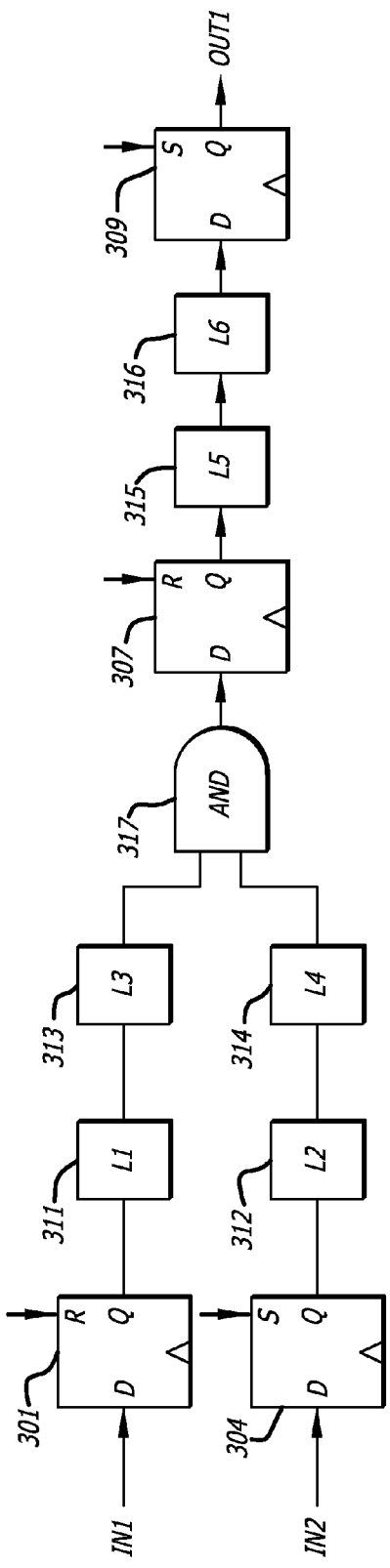

FIGS. 3A-3B illustrate a forward register retiming movement. In FIG. 3A, a circuit includes D-flip flops or registers 301-305 and logic blocks 311-316 coupled together between inputs IN1-IN2 and an output OUT1 as shown. Arrows 320-321 illustrated forward movement of registers 302 and 305 to perform retiming and eliminate a register. Forward register movement is usually preferable over backward register movement due to the ease of handling set, reset, or other control signals at the registers. FIG. 3B illustrates the instantiation of register 307 in place of registers 302 and 305.

Arrow 323 in FIG. 3A further illustrates the forward movement of register 303 in front of the logic block 316. FIG. 3B illustrates the instantiation of register 309 in front of the logic block 316 in place of register 303. The logic blocks 315-316 are now between registers 307 and 309.

It has been shown that retiming preserves functionality when the retiming values for the primary inputs (PI) and the retiming values for the primary outputs (PO) are zero.

Let r be a retiming of a circuit where r(v) is the retiming value of a node v, r(u) is the retiming value of a node u, and $w(e_{uv})$ is the weight of an edge $e_{uv}$ in the initial circuit. If the retiming value r(u) of the node u is positive there is backward register movement. If the retiming value r(u) of the node u is negative there is forward register movement.

The weight $w_r(e_{uv})$ of the edge $e_{uv}$ in the retimed circuit is $$w_r(e_{uv}) = w(e_{uv}) + r(v) - r(u) \quad (1)$$

A retiming that results in nonnegative edge weights $w_r(e_{uv})$ is called a legal retiming.

The clock period of a circuit is the maximum delay on the combinational paths (paths without registers) in the circuit. A circuit can be retimed to a clock period T if a legal retiming exists for which the retimed circuit has the clock period of at most T. If a legal retiming does not exist or if the clock period of the retimed circuit is greater than T, a circuit can not be retimed.

Leiserson and Saxe introduce matrices W and D, that are defined for all pairs of nodes (u,v) for which a u-v-path exists. W(u,v) denotes the minimum number of registers on all u-v-paths and D(u,v) is the maximum delay of all u-v-paths which have the minimum number of registers.

The minimum area retiming problem, which minimizes the number of registers for a given clock period T was formulated by Leiserson and Saxe as the following linear program (LP2), which also may be referred to as a minimized area retiming program:

$$\min(|FI(v)| - |FO(v)|)r(v)$$

subject to $$r(u) - r(v) \leq w(e_{uv}) \; \forall e_{uv} \in E$$

$$r(u) - r(v) \leq W(u,v) - 1 \; \forall D(u,v) \geq T \quad (2)$$

That is to minimize area during retiming, one minimizes the product of the difference between the number of fanin and fanout edges at a node v and the retiming r(v) of the node under a couple of node constraints. The first constraint, referred to as a register constraint, ensures that after retiming the number of registers of every edge is nonnegative ($w_r(e) \geq 0$). The edge weight $w(e_{uv})$ for each pair of nodes of the initial circuit is greater than or equal to the difference between the retiming values r(u) and r(v). The second constraint, referred to as a period constraint, ensures that there is at least one register on every u-v-path for which the total delay D(u,v) along the u-v-path is greater than or equal to the given target clock period T.

The linear program LP2 is the dual of a network flow problem which can be solved efficiently by a polynomial time algorithm.

However to solve a minimum period retiming problem, a retiming solution is sought to achieve the best possible clock period. That is, the smallest T is sought out for which the linear program LP2 has a solution.

To perform retiming in the embodiments of the invention, a solution to the linear program is sought which minimizes the clock period as a first criteria and also minimizes the number of registers as a second criteria. This is achieved by performing a binary search over the clock period T and successively checking if a solution for the linear program LP2 exists. In order to efficiently perform the binary search a good lower and upper bound on the best possible clock period is required.

In the paper "Utilizing the retiming-skew equivalence in a practical algorithm for retiming large circuits" by S. S. Sapatnekar and R. B. Deokar, IEEE Transactions on Computer Aided Design of Integrated Circuits and Systems, vol. 15, pp 1237-1248, October 1996 (referred to herein as "Sapatnekar and Deokar") incorporated herein by reference; a-skew-to-retiming-algorithm (ASTRA) was introduced. A clock latency schedule for a register-to-register graph was first computed. The register-to-register graph has a node for each register. A special host node represents all primary inputs and outputs. Whenever there is a combinational path from a register u to a register v, the graph contains an edge e=(u,v). The weight d(e) of the edge e represents the maximum propagation delay out of all the paths from the register u to the register v. The register u at node u has its own latency or delay l(u) with respect to the clock in generating data at its output. The problem to minimize the clock period T by clock latency scheduling can be formulated as the following linear program (LP3), which may be referred to herein as register graph clock scheduling program:

$$\min T$$

$$\text{such that } l(u)+d((u,v))-T \leq l(v) \; \forall (u,v) \in E \quad (3)$$

The optimum clock period achievable by clock latency scheduling gives a lower bound on the clock period which can be obtained by retiming. The computed clock latencies can be used to retime the circuit. The registers with a positive clock latency l(u) are moved backward. The registers with a negative clock latency l(u) are moved forward. Sapatnekar and Deokar show that the final clock period of the resulting retiming is not larger than the clock period achievable with the clock latencies plus the maximum delay of all gates, hence this gives a good upper bound.

In the paper "Efficient implementation of retiming" by N. Shenoy and R. Rudell, *Digest of Technical Papers of the IEEE/ACM International Conference on Computer-Aided Design*, (San Jose, Calif.), pp. 226-233, November 1994, incorporated herein by reference (referred to hereafter as "Shenoy and Rudell"), a very efficient algorithm to extract the constraints for the network flow problem was developed.

In the Maheshwari & Sapatnekar-I paper "Efficient retiming of large circuits" cited previously, a clock latency scheduling was used to further improve the runtime of the minimum area retiming problem for a given clock period (referred to as a "Minaret algorithm"). Two clock latency schedules were computed. The first clock latency schedule was computed with latencies as small as possible (ASAP), the second schedule with latencies as large as possible (ALAP). When these clock latency schedules are realized by retiming, the first solution results in a retiming where all registers are moved forward by as much as possible and similarly the second solution results in a retiming where all registers are moved backward by as much as possible. Based on these two solutions, lower and upper bounds on the retiming values r of the nodes can be derived. This helps to eliminate a good portion of the variables in the minimized area retiming program (2) and of the period constraints.

In the paper "Understanding retiming through maximum average-delay cycles" by M. C. Papaefthymiou, *Theory of Computing Systems (Historical Archive)*, vol. 27, pp. 65-84, January 1994, incorporated herein by reference (referred to hereafter as "Papaefthymiou"), and the paper "Continuous retiming: Algorithms and applications" by P. Pan, *IEEE International Conference on Computer Design: VLSI in Computers and Processors*, (Austin, Tex.), pp. 116-121, October 1997, incorporated herein by reference (referred to hereafter as "Pan"), lower bounds are derived on the clock period without the register-to-register graph and directly use the retiming graph. However, neither consider any bounds on the retiming values. The proofs by Papaefthymiou and Pan differ from those disclosed herein and may not be able to be extended to take into consideration upper and lower bounds.

Registers with Control Signals and Initial States

Some registers require no initialization to an initial state and are free running. In this case, a clock signal and a data signal may be all that is coupled into each flip flop of a register. However, a system may have a plurality of different clock signals such that different clock signals are coupled into various registers. For example, different clock signals may be coupled into each functional block such that selective portions of a system corresponding to one or more functional blocks may have their clocks turned when inactive to conserve power. Registers may be classified differently into different register classes based upon the clock signal that they receive.

In other cases, registers require initialization or further control and receive some other control signals. In this case, the registers not only receive a clock signal but they also receive a control signal. For example, a register may have a load enable signal that differs from other registers. A register may have a synchronous or an asynchronous set and/or reset signal coupled to each flip-flop that are controlled differently by differing control signals. Registers may be further classified differently into different register classes based upon the control signals that they receive.

Based upon the different clock and control signals, registers are assigned to differing register classes. All registers in the same register class receive the same clock and control signals. As the registers are moved forward and backward in the combinational logic, only registers of the same class are combined together during the retiming process. Registers in different register classes are not combined together during the retiming process. For example, negative edge triggered registers in one register class are not merged together with positive edge triggered registers during the retiming process.

As a result of the different register classes, additional lower and upper bounds may be placed on the retiming values. The registers are moved forward iteratively as far as possible, taking into account that some registers may not be merged together because they belong to different classes. For each node v we obtain a lower bound $r'(v) \leq 0$ on the retiming value r(v). Similarly, we move the registers backward as far as possible, and obtain an upper bound $r''(v) \geq 0$ on the retiming value r(v).

Additionally registers that are initialized to an initial state, add to the complexity of the retiming of a circuit. This is the case when registers are set or reset to an initial state in one position and are moved during the retiming process. What are the required reset/set values for registers when they are moved to a new location in the data path curing retiming. The resultant output of a register at its original position in response to the original set/reset values need to be propagated through the combinational logic to the new position of the register and a new set/reset value needs to be determined for the register in the new position. This is particularly problematic when registers are moved backward in the combinational logic, such that a justification problem has to be solved.

Figure 3C:
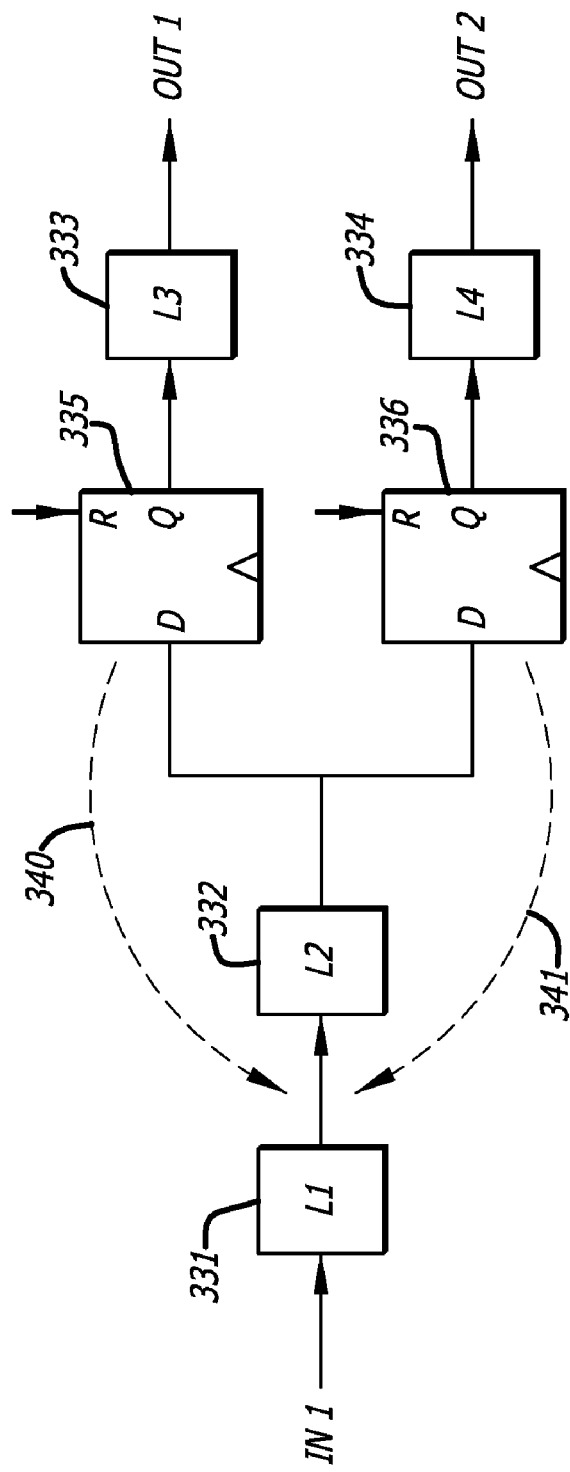

For example, consider retiming the circuit in FIG. 3C with logic 331-334 and registers 335-336 by moving registers 335 and 336 backward over the logic L2 332, such as indicated by the arrows 340-341, respectively. If the outputs of register 335 and register 336 are initialized to the same state, the registers 335 and 336 may be moved backward over the logic L2 332 and merged into one new register. However, if the outputs of the register 335 and register 336 are initialized to different states (e.g., the output of the register 305 is initialized to logical zero and the output of the register 306 is initialized to logical one), then moving the two registers backward over the gate L2 332 creates a justification problem. The new register, the result of merging the two backward moving registers, can only be initialized to one logical value. Propagating the initialized value to the original locations of the registers should result in the given initialized values. However, if the outputs of the register 335 and register 336 are initialized to different states, the registers cannot be retimed backward in this example and the circuit cannot be retimed. In contrast moving registers of the same register class forward and merging them together is always possible. The reset values are just propagated forward as the registers are moved.

In the paper "Computing the initial states of retimed circuits," by H. J. Touati and R. K. Brayton, *IEEE Transactions on Computer-Aided Design*, vol. 12, pp. 157-162, January 1993, incorporated herein by reference, registers with initial states are moved only forward. However, a set of registers at the primary outputs may be removed and placed back at the primary inputs.

In the paper "A practical approach to multiple-class retiming" by K. Eckl, J. C. Madre, P. Zepter, and C. Legl, *Proceedings of the 36th ACM/IEEE Design Automation Conference*, (New Orleans, La.), pp. 237-242, June 1999, incorporated herein by reference (referred to hereafter as "Eckl"), a binary decision diagram (BDD) is built up as registers are moved backward. The variables correspond to the reset value for the registers. If the BDD does no longer have a solution, the justification fails and an upper bound on the retiming value is added to the retiming problem. The retiming problem is then solved again. However, there is no lower bound on the retiming value.

In the paper "Retiming control logic" by N. Maheshwari and S. S. Sapatnekar, *Integration, the VLSI Journal*, vol. 28, no. 1, pp. 33-53, 1999, incorporated herein by reference (referred to hereafter as "Maheshwari & Sapatnekar-II"), a backtracking algorithm is provided for retiming registers with initial states. As a subproblem they solve the minimum area retiming problem with upper bounds on the retiming values due to the justification. However, there is no lower bound on the retiming value.

Constrained Minimum Period Retiming

In the embodiments of the invention, a synchronous circuit $G=(V,E,d,w)$ is retimed with lower bounds $r^l(v)$ and upper $r^u(v)$ bounds of the retiming values $r(v)$ for each node v. As discussed previously registers are iteratively moved forward as far as possible to obtain a lower bound $r^l(v) \leq 0$ on the retiming value $r(v)$ for each node. A lower bound on the retiming value constrains the forward movement of registers. The registers are iteratively moved backward as far as possible to obtain an upper bound $r^u(v) \geq 0$ on the retiming value $r(v)$. An upper bound on the retiming value constrains the backward movement of registers. Thus, the synchronous circuit $G=(V,E,d,w)$ is to be retimed so that $r^l(v) \leq 0 \leq r^u(v)$ for all $v \in V$. Thus, the embodiments of the invention search for a legal retiming r with a minimum clock period subject to the constraint $r^l(v) \leq r(v) \leq r^u(v)$ for all $v \in V$.

In order to achieve a good lower bound on the clock period achievable by retiming and a good initial retiming solution (upper bound), additional constraints due to different register classes are considered in the preferred embodiments of the invention. A new linear program formulation is disclosed to derive better lower bounds and upper bounds on the clock period achievable by retiming.

Reference is now made to FIGS. 4A-4B to explain the motivation for developing a new linear programming formulation. FIG. 4A shows an exemplary retiming graph 400A of a circuit. FIG. 4B illustrates a register-to-register graph 400B of the same circuit.

In the retiming graph 400A of the circuit there are a plurality of nodes 401-410 and registers RA-RC between two primary inputs PIA,PIB and two primary outputs POA,POB. Associated with each of the nodes 401-410 is a delay indicated above each. Assume that the registers RA and RB receive different control signals and belong to different register classes. Thus, registers RA and RB cannot be combined together and retimed forward over the node x 407 because they are in different register classes. The clock period is determined by the by the path from register RB to the primary output POB as register RB cannot be moved forward. The total delay from register RB to POB is 26. Because there is only one register along the path from RB to POB, the clock period may not be smaller than 26/2 or 13. Thus, the optimal clock period which can be achieved by retiming in the circuit is thirteen.

The optimal clock period can be achieved by retiming the circuit: Register RC may be moved backward one node over node 409 to a position RC' during the retiming process for example. Register RA may be moved forward one node over node 402 to position RA' just before node x 407 and duplicated and moved forward two nodes over node 402-403 to a position RA" between nodes 403 and 404 during the retiming process. The duplicated register RA" may be moved further forward over node 404 but in this case rests between nodes 403 and 404 to minimize register movement.

Thus, the delay between a register RA" and the primary output POA is ten. The delay between the primary input PIA and register RA" is ten. The delay from register RA" to the primary output POA is ten. The delay from registers RA' and RB to register RC' is thirteen. The delay from register RC' to the primary output POB is thirteen. The delay from the primary input PIA to the register RA' is two. The delay from the primary input PIB to register RB remains 4.

In the register-to-register graph 400B of the circuit illustrated in FIG. 4B, there are register nodes RA, RB, and RC and an input/output node I/O with timing delays along the arcs between each. From the I/O node to the register node RA, the timing delay is one. From the I/O node to the register node RB, the timing delay is 4. From the register node RA to the I/O node, the timing delay is 19. From the register node RA to the register node RC, the timing delay is 17. From the register node RB to the register node RC the timing delay is 16. From the register node C to the I/O node, the timing delay is 10.

Clock latency scheduling may be performed with the register-to-register graph 400B assuming that all registers are in the same register class by ignoring the constraint that the two registers RA and RB are in different register classes.

With clock latency scheduling, a clock period for 10 can be achieved which is far below the clock period achievable by retiming. To achieve this clock period, register RA has a clock latency of $l(RA)=-9$, register RB has a clock latency of $l(RB)=-6$, and register RC has a latency of $l(RC)=0$.

If this clock schedule is realized by retiming, register RC would not get moved, because it has a clock latency of 0. Since register RB cannot be retimed forward over node X, the clock period is limited by the path from register RB to register RC which is 4+9+3=16.

It is not possible to add a constraint to the clock latency scheduling problem on the register-to-register graph 400B. If we were to add the constraint that the two registers RA and RB are in different register classes and cannot be combined, register RA can only be moved forward in the direction of node X 407 over one node, node 402 which has a delay of one time unit, to position RA'. If we add a lower bound of −1 time unit to the clock latency of register RA in FIG. 4B, we would get a clock period of 18 between register RA and register RB that is still not a lower bound on the clock period. Thus, it is not possible to achieve a good lower and upper bound on the clock period by using clock latency scheduling on a register-to-register graph in the presence of constraints on the retiming values, such as a constraint due to different register classes.

A linear program for retiming circuits is now formulated which takes the lower and upper bounds on the retiming values into account and still provides a lower bound on the clock period. The methodology of the linear program efficiently handles the constraints due to the different register classes.

Instead of using clock latency scheduling on a register-to-register graph, a retiming graph is directly used. Instead of having variables for clock latencies of all registers, an arrival time variable a(v) is defined for every node v in the circuit. The arrival time variable a(v) represents the arrival time of the data signal at the gate input pins of the logic gate corresponding to the node v for the initial circuit that has yet to be retimed. The arrival time variable $a_r(v)$ represents the arrival time of the data signal at the gate input pins of the logic gate corresponding to the node v in the retimed circuit. The vector of the arrival times a(v) for all vertices or nodes v in the set V (i.e., v∈V) is denoted by $(a(v))_{v \in V}$.

For a given feasible clock period $T_r$, the arrival times a(v) for each node v can be determined by a simple longest path computation in a retiming graph without positive cycles. For this, each edge $e_{uv}$ has a weight of $d(u)-w(e_{uv})T_r$. A cycle of edges is positive ("positive cycles") if the sum of the weights of the cycle is positive.

A circuit retimed with a legal retiming r has a feasible clock period $T_r$ if there is a solution to following system of inequalities:

$$a_r(u) + d(u) \leq a_r(v) \quad \forall e_{uv} \in E \text{ with } w_r(e_{uv}) = 0 \quad (4)$$
$$0 \leq a_r(v) \quad \forall v \in V$$
$$a_r(v) + d(v) \leq T_r \quad \forall v \in V$$

This proposition follows directly from the arrival time computation for timing analysis.

If we allow retiming, we can have negative arrival times and arrival times larger than the clock period. When a register is moved forward over a node v, the arrival time of the node is increased by the clock period T. When a register is moved backward over a node, the arrival time of the node is decreased by the clock period T. With this in mind, a linear program LP5 for the retiming graph, referred to as a constrained minimum period retiming arrival time program, can be formulated:

Minimize T
subject to $$a(u) + d(u) - w(e_{uv})T \leq a(v) \quad \forall e_{uv} \in E \quad \text{(LP5)}$$
$$r^l(v)T \leq a(v) \quad \forall v \in V$$
$$a(v) + d(v) - (r^u(v)+1)T \leq 0 \quad \forall v \in V$$

It can be shown that the optimal solution of the constrained minimum period retiming arrival time program provides a lower bound for the constrained minimum period retiming problem. It can also shown how a solution of the constrained minimum period retiming arrival time program can be converted into a retiming which has a clock period no greater than the minimized T solution of the constrained minimum period retiming arrival time program plus the maximum delay of all gates in the circuit.

In the linear program LP5 the arrival time variables a(v), v∈V can be interpreted as arrival times. However, the arrival time variables can be negative or largely positive, possibly greater than the clock period.

The embodiments of the invention disclosed herein do not work with a register-to-register graph but a retiming graph. Moreover, the retiming is computed directly in the embodiments of the invention based on arrival times without an interative register movement process.

The set of inequality equations for the constrained minimum period retiming arrival time program is a special type. An additional arrival time variable a(h) for a host node h can be added to the left side of the second inequality and similarly to the right side of the third inequality. We can assume that the arrival time variable a(h) for the host node is zero.

For any solution of the linear program LP5 we can add a constant c to all the arrival time variables a(v) for each v∈V∪{h}. This results in a new solution for the linear program and if we set c=−a(h), then a(h)=0 in the new solution.

After this transformation, each inequality has one of the variable a(v), v∈V∪{h} on the left side and on the right side as shown:

$$a(u) + d(u) - w(e_{uv})T \leq a(v) \quad \forall e_{uv} \in E$$
$$a(h) + r^l(v)T \leq a(v) \quad \forall v \in V$$
$$a(v) + -d(v) - (r^u(v)+1)T \leq a(h) \quad \forall v \in V$$

Note that in the first inequality the objective variable T may not subtracted (for example when $w(e_{uv})=0$) for a given edge and pair of nodes. In the other inequalities, the objective variable T may be subtracted once or several times depending upon the value of $r^l(v)$ and upper $r^u(v)$.

Thus, with −T equal to λ, the constrained minimum period retiming arrival time program may be rewritten in the form of linear program LP6 as follows:

maximize λ
subject to $$x(i)+c(i,j)-p(i,j)\lambda \geq x(j) \quad \text{(LP6)}$$

where each p(i,j) is a nonnegative integer.

This form of linear program LP6 may be solved with a Bellman-Ford algorithm using a binary search over the variable λ and testing for a negative cycle each time. The graph in which each edge has a weight of $w_{ij}=c(i,j)-p(i,j)\lambda$ must not have a cycle in which the sum of the weight is negative. The system of inequalities of LP6 has a solution if and only if the graph does not have a negative cycle.

However in one embodiment of the invention, the form of linear program LP6 may be solved directly with an extension of the parametric shortest paths (PSP) algorithm described in "Faster Parametric Shortest Path and Minimum Balance Algorithms," by N. E. Young, R. E. Tarjan, and J. B. Orlin, *Networks*, vol. 21, no. 2, pp. 205-221, 1991, incorporated herein by reference (hereafter referred to as "Young, Tarjan, and Orlin").

The parametric shortest path (PSP) algorithm by Young, Tarjan and Orlin, cited previously, solves the linear program with each p(i,j) having the value of one or zero (i.e., p(i,j)∈{0, 1}). However, it is straightforward to extend the PSP algorithm to the more general case of any non-negative integer.

In the linear program LP6, let n be the number of variables, m the number of inequalities and C be the maximum parameter p(i,j) of the inequalities. The value of C is bounded by the maximum number of registers on any primary input to primary output path and on any cycle in the retiming graph.

Thus, the number of operations required by the parametric shortest paths algorithm by Young, Tarjan and Orlin (cited previously) to find a solution to the linear program LP6 can be bounded by $K(nm+Cn^2 \log n)$, where K is a constant.

Compared to a clock scheduling problem on a register-to-register graph, the linear program has many more variables to deal with. However, the register-to-register graph for the clock scheduling problem may contain substantially more edges corresponding to constraints. That is, the number of edges in a register-to-register graph that need computing may be greater than the number of edges in a retiming graph.

Lower Bound on the Minimum Clock Period

An optimal solution for minimized T in the constrained minimum period retiming arrival time program (LP5) provides a lower bound on the minimum clock period of the constrained minimum period retiming problem.

If a legal retiming r exists such that the retimed circuit has a feasible clock period $T_r$, a solution can be constructed with $T=T_r$ with $(a_r(v))_{v \in V}$, $T_r$ being a solution to the system of linear inequalities (4). In which case, it can be shown that if the arrival time at each node in the untimed circuit is equal to the sum of the respective arrival time and a product of the clock period with the respective retimed value for each node $$a(v) := a_r(v) + r(v)T \text{ for all } v \in V \text{ and } T := T_r. \quad (7)$$

that it provides a solution for the constrained minimum period retiming arrival time program. This is sufficient to show that the optimal solution of the constrained minimum period retiming arrival time program provides a lower bound of the clock period achievable by retiming. Take any retiming and construct a solution of the constrained minimum period retiming arrival time program with the same clock period.

Legal Retiming

Moreover, if a feasible solution $(a(v))_{v \in V}$, T for the constrained minimum period retiming program (LP5) exists, then a retiming value for each node computed by rounding down the quotient of the arrival time at the respective node divided by the clock period $$r(v) := \left\lfloor \frac{a(v)}{T} \right\rfloor \quad (8)$$

provides a legal retiming for the constrained minimum period retiming problem with a feasible clock period $T_r$ no greater than the sum of the clock period and the maximum gate delay (i.e., $T_r$ less than or equal to T+D) where D is the maximum delay of all gates (i.e., $D = \max_{v \in V} d(v)$). Note that the retiming of each node is constrained between upper and lower bounds and that the constraint $r^l(v) \leq r(v) \leq r^u(v)$ is satisfied because of the second and third inequalities of the constrained minimum period retiming arrival time program (LP5). Moreover it can be shown (1) that the retiming r is a legal retiming and (2) that the arrival times $a_r(v)$ for all $v \in V$ and the clock period $T_r$ defined in equation 9 as follows:

$$a_r(v) := a(v) - r(v)T \text{ for all } v \in V \text{ and } T_r := T + D \quad (9)$$

provide a solution to the system of linear inequalities in Eq. 4. That is, the arrival time at each node in the retimed circuit is equal to the difference of the respective arrival time in the initial circuit and the product of the clock period with the respective retimed value for each node, and the clock period $T_r$ is equal to the sum of the clock period and the maximum gate delay.

Upper Bound on the Minimum Clock Period

The optimum solution of the constrained minimum period retiming problem has a clock period $T_r$ that is no greater than (i.e., less than or equal to) the optimum solution (Min T) for the constrained minimum period retiming arrival time program (LP5) and the maximum gate delay D of all gates instantiated in a circuit. That is, $T_r = \text{Min T} + D$.

Bounding Retiming Values

In the Maheshwari & Sapatnekar-II paper "Retiming control logic" cited previously, the number of period constraints is reduced in the network flow formulation for minimizing the number of registers. The number of period constraints is reduced by computing upper and lower bounds on the retiming values and determining which nodes if any, for which a retiming value has already been determined. However, an upper bound and a lower bound on retiming values may be further used to determine if a retiming can achieve a feasible clock period or not. Moreover, the upper bounds and the lower bounds of the retiming values for each node may be computed from a solution of the constrained minimum period retiming arrival time program (LP5) respectively with arrival times $(a(v))_{v \in V}$ as large as possible (i.e., the largest arrival times) and arrival times $(a(v))_{v \in V}$ as small as possible (i.e., the smallest arrival times).

To determine an upper bound on the retiming values, for any retiming r which achieves a clock period $T_r$, there exists a solution $(a(v))_{v \in V}$, for the linear inequalities of the constrained minimum period retiming arrival time program (LP5) with $T := T_r$, such that the retiming values for each node is less than or equal to the quotient of the largest arrival time at the respective node divided by the clock period as shown in the following equation $$r(v) \leq \left\lfloor \frac{a(v)}{T} \right\rfloor \text{ for all } v \in V.$$

This inequality provides an upper bound on the retiming value $r(v)$ if $(a(v))_{v \in V}$ is a solution for the constrained minimum period retiming program (LP5) in which the arrival times $(a(v))_{v \in V}$ are as large as possible.

Referring now to FIGS. 5A-5B, an exemplary retiming graph 500A is illustrated with possible arrival times and retiming values for each node corresponding to the exemplary retiming graph 500B of FIG. 5B. The possible arrival times and retiming values are indicated below each node with the retiming values enclosed by parenthesis.

The possible arrival times indicated in the exemplary retiming graph 500 achieve the optimal solution of T=13 for the constrained minimum period retiming arrival time program (LP5). Note that the node x 407 has the constraint that its retiming value being greater than or equal to zero (i.e., $r(x) \geq 0$) because registers RA and RB cannot be combined and moved forward over node x 407. This means that registers may be moved backward over node x 407 so that its retiming r(x) is positive. The lower bound on the retiming value of node x 407 results in constraint for the arrival times at node x 407 being greater than or equal to zero (i.e., $a(x) \geq 0$).

The retiming values of the nodes in parenthesis are determined so that a legal retiming may be found. The retiming values are less than or equal to the rounded down value of the quotient of the arrival time at the respective node divided by the clock period. For example, the retiming value of node 409 is determined by dividing its arrival time 13 by the clock period 13 and rounding down if need be. The retiming value of node 409 is one (1). The retiming value of node 404 is the arrival time −3 divided by the clock period 13 which is a negative fraction (−3/13) that is further rounded down to a retiming value of minus one (−1). Similarly, the retiming value of node 404 is the arrival time −12 divided by the clock period 13 which is a negative fraction (−12/13) that is further rounded down to minus one (−1). The retiming value of node 408 is the arrival time 4 divided by the clock period 13 which is a positive fraction (4/13) that is further rounded down to zero (0).

Referring now to FIGS. 5A-5B, recall that a positive retiming value indicates a backward register movement over the given node and a negative retiming value indicates a forward register movement over the given node. Thus if register movement is not minimized, register RA may be moved forward over nodes 402-404 to position RA''' along the path from PIA to POA and no further because each of nodes 402-404 has a negative one retiming value and the retiming value of node 405 is zero. Register RA is duplicated and moved forward over node 402 to position RA' along the path from PIA to POB and no further as node 402 has a negative one retiming value and node 407 has a retiming value of zero. This is the case as the fanout from node 402 is greater than one. Register RB does not move over either node 406 or 407 as their respective retiming values are zero. Register RC moves backward over node 409 along the path from PIA to POA and no further to position RC' as the retiming value of node 409 is positive one and the retiming value of node 408 is zero.

To determine a lower bound on the retiming values, for any retiming r which achieves a clock period $T_r$, there exists a solution a(v), v∈V, for the linear inequalities of the constrained minimum period retiming arrival time program (LP5) with T:=$T_r$ such that the retiming values for each node is greater than or equal to the rounded up quotient of the sum of the smallest arrival time and the delay time of the respective node divided by the clock period less one as shown in the following equation:

$$\left\lceil \frac{a(v) + d(v)}{T} \right\rceil - 1 \leq r(v) \text{ for all } v \in V.$$

The upper and lower bound inequalities may be combined together to form the range over which the retiming values for each node are bounded.

The lower and upper bounds on the retiming value may be determined from equation 10 as follows. Let $(\overline{a}(v))_{v \in V}$ be a solution for the linear inequalities in the constrained minimum period retiming program (LP5) for a given clock period T with the arrival times $\overline{a}(v)$ as large as possible for every v∈V. Similarly, let $(\underline{a}(v))_{v \in V}$ be a solution for the linear inequalities of the constrained minimum period retiming program (LP5) with arrival times $\underline{a}(v)$ as small as possible for every v∈V. Then for any retiming r which achieves the clock period T, the following inequality holds:

$$\left\lceil \frac{\underline{a}(v) + d(v)}{T} \right\rceil - 1 \leq r(v) \leq \left\lfloor \frac{\overline{a}(v)}{T} \right\rfloor \text{ for all } v \in V. \quad (10)$$

Given a solution for the linear inequalities of the constrained minimum period retiming arrival time program (LP5) computed with the PSP algorithm by Young, Tarjan and Orlin (cited previously) for example, a solution for the constrained minimum period retiming program (LP5) with the arrival times as large as possible or as small as possible can be computed with Dijkstra's algorithm to solve a single-source shortest path problem. [See *Introduction to Algorithms* by Thomas H. Cormen, Charles E. Leiserson, Ronald L. Rivest, and Clifford Stein, Second Edition. MIT Press and McGraw-Hill, 2001, Section 24.3: Dijkstra's algorithm, pp. 595-601; and "*A Note on Two Problems in Connexion with Graphs*" by E. W. Dijkstra, *Numerische Mathematik*, 1 (1959), pp. 269-271, which are both incorporated herein by reference.]

However, there may be cases in which for a given clock period T there exists a solution to the linear inequalities in the constrained minimum period retiming arrival time program (LP5) but the lower bound of the retiming value may be larger than the upper bound of the retiming value for a node v∈V. If this is the case, we can conclude that a retiming which tries to achieve the clock period T does not exist and we do not need to construct the minimum area retiming program and test if it has a solution.

Iteratively Bounding the Retiming Values and Determining Infeasibility

As discussed previously, a lower bound on the clock period for the constrained retiming problem may be computed with given upper and lower bounds on the retiming values. Additionally, new lower and upper bounds on the retiming values may be computed given arrival times as small as possible for each node and arrival times as large as possible for each node, respectively. The newly computed upper and lower bounds on the retiming values are usually stronger than the given bounds and may be used to determine that a certain given clock period cannot be achieved by a retiming, as was discussed previously. With this in mind, a path in a circuit may have its retiming values iteratively bounded to determine feasibility or infeasibility of retiming the circuit.

Figure 6:
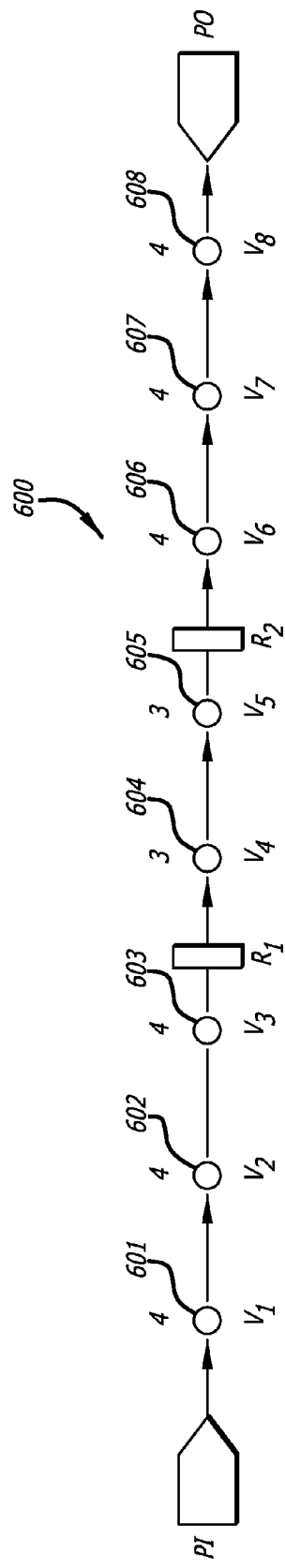
FIG. 6 is an exemplary retiming graph to show how iteratively bounding of the retiming values may occur.

Referring now to FIG. 6, an exemplary retiming graph is illustrated for iteratively bounding the retiming values. FIG. 6 shows a path from a primary input PI to a primary output PO with eight gates represented by the nodes v1 601 through v8 608 and two registers R1, R2 on the edges $(v_3, v_4)$ and $(v_5, v_6)$. The numbers above each node is the gate delay of each gate at the node.

The lower bound on the clock period, a feasible clock period, is computed by solving the constrained minimum period retiming arrival time program.

The optimal solution with T=10 is with the arrival times of $a(v_1)$=0, $a(v_2)$=4, $a(v_3)$=8, $a(v_4)$=2, $a(v_5)$=5, $a(v_6)$=−2, $a(v_7)$=2, $a(v_8)$=6. Hence the lower bound on the clock period from the solution to the constrained minimum retiming arrival time program (LP5) is 10.

It may be desirable to lower the clock frequency and increase the clock period to decrease the cost of a circuit. It may be desirable to retime the circuit with a target clock period of 11 units instead of the lower bound of 10. To determine feasibility or infeasibility of retiming the circuit with a target clock period of 11 units instead of the lower bound of 10 units, the constrained minimum period retiming arrival time program may be solved with T=11 and the arrival times as small as possible: $a(v_1)$=0, $a(v_2)$=4, $a(v_3)$=8, $a(v_4)$=1, $a(v_5)$=4, $a(v_6)$=−4, $a(v_7)$=0, $a(v_8)$=4. Similarly, the constrained minimum period retiming arrival time program may be solved with T=11 with the arrival times as large as possible: $a(v_1)$=3, $a(v_2)$=7, $a(v_3)$=11, $a(v_4)$=4, $a(v_5)$=7, $a(v_6)$=−1, $a(v_7)$=3, $a(v_8)$=7.

For node $v_3$ 630 we compute according to equation 10:

$$r(v_3) \geq \left\lceil \frac{\underline{a}(v_3) + d(v_3)}{T} \right\rceil - 1 = \left\lceil \frac{8+4}{11} \right\rceil - 1 = 1$$

For node $v_6$ 606 we compute according to equation 10 that $$r(v_6) \leq \left\lfloor \frac{\overline{a}(v_6)}{T} \right\rfloor = \left\lfloor \frac{-1}{11} \right\rfloor = -1$$

The constraint $r(v_3) \geq 1$ results in the constraint $a(v_3) \geq T$ and the constraint $r(v_6) \leq -1$ results in the constraint $a(v_6) + 4 \leq 0$ for the constrained minimum period retiming arrival time program.

With these additional constraints we get the following solution. When the arrival times are as small as possible the solution is: $a(v_1)=0$, $a(v_2)=4$, $a(v_3)=11$, $a(v_4)=4$, $a(v_5)=7$, $a(v_6)=-1$, $a(v_7)=3$, $a(v_8)=7$. Similar, the following is the solution with the arrival times as large as possible: $a(v_1)=0$, $a(v_2)=4$, $a(v_3)=8$, $a(v_4)=1$, $a(v_5)=4$, $a(v_6)=-4$, $a(v_7)=3$, $a(v_8)=7$.

Computing bounds on the retiming values for nodes $v_3$ 603 and node $v_6$ 606 once again results in $r(v_3) \leq 0$ and $r(v_6) \geq 0$, respectively. These new bounds are a contradiction to the previous bounds. The retiming value for node $v_6$ 606 cannot be both greater than or equal to zero and less or equal to negative one at the same time. The retiming value for node $v_3$ 603 cannot be both greater than or equal to one and less or equal to zero at the same time. This is in contradiction to equation 10 and it can be concluded that it is not possible to achieve a clock period of T=11 by retiming the given circuit.

The computing process may be reiterated with a new possible feasible clock period. For example, the lower bound on the clock period may be used as a new possible feasible clock period to achieve a retiming of the circuit.

Circuit Retiming with Desired Properties

Circuit retimings with certain desired properties can be found. For example, a retiming can be quickly found in accordance with the embodiments of the invention for which the movement of the registers in the circuit is minimized. With retimings of circuits being quickly found with the embodiments of the invention, they can be repeatively performed to find a more desired retiming. Additionally, a retiming can be computed in which the maximum delay of all combinational paths is minimized but in which most paths have a delay not greater than a given target clock period. This may be used in determining the critical path of the circuit design.

Computational results have shown that if the movement of the registers is minimized, a retiming can be found extremely fast. Moreover, forward register movement rather than backward register movement can ease the computations needed by minimizing a initial state problem in the registers being moved. A method of retiming is further disclosed that minimizes register movement and performs forward register movement over backward register movement in order to more quickly perform a retiming of a circuit.

In one embodiment of the invention, delay factors are introduced to exaggerate the gate delay of each gate in a data path.

Fast Retiming to Minimize Register Movement with Forward Register Movement Bias

In certain cases, minimizing the number of registers can be extremely CPU expensive. This is especially the case if the given clock period is large, such as from a critical area in the circuit design. A large clock period can increase the number of period constraints in the network flow formulation and the computations performed for retiming a circuit. In order to reduce the computations during circuit retiming, a retiming can be made that minimizes the clock period, moves registers rather forward than backward (good for the justification problem for registers with initial states) and keeps registers as close as possible to their original or initial location.

Given a retiming graph $G=(V,E,d,w)$ of a circuit, it is desirable to find a circuit retiming r that minimizes register movement and if a register is to be moved that the register moves forward rather than backward if possible. This type of retiming may be found by one call to the modified algorithm of Young, Tarjan and Orlin (cited previously) and two calls to Dijkstra's shortest path algorithm (cited previously). These algorithms are both used directly with a retiming graph of the circuit.

After a retiming graph is formed of the circuit, the constrained minimum period retiming arrival time program (LP5) may be solved with a possibly feasible clock period. The phrase possibly feasible clock period may also be referred to herein as a potential clock period. With an initial solution to the constrained minimum period retiming arrival time program (LP5), a solution of the constrained minimum period retiming arrival time program (LP5) is computed with all arrival times $(a'(v))_{v \in V}$ being as small as possible using the Dijkstra's shortest path algorithm (cited previously).

Next the constrained minimum period retiming arrival time program (LP5) is modified with an additional constraint in response to the prior solution for minimized T.

For each nodes, $v \in V$, the constraint that the sum of the arrival time of the node and the gate delay at the node is less than or equal to the clock period as in the equation $a(v)+d(v) \leq T$ is added to the constrained minimum period retiming arrival time program (LP5) if the sum of the arrival time of the node and the gate delay at the node is less than or equal to the clock period as in the equation $a(v)+d(v)>T$. Otherwise if the sum of the arrival time of the node and the gate delay at the node is greater than the clock period as in the equation $a(v)+d(v)>T$, then the constraint of the sum of the arrival time of each node and the gate delay at each node is less than or equal to sum of the minimum arrival time of the node $a'(v)$ and the gate delay at the node as in the equation $a(v)+d(v) \leq a'(v)+d(v)$ is added to the constrained minimum period retiming arrival time program (LP5). Thus, the constrained minimum period retiming arrival time program (LP5) is modified to $$a(u) + d(u) - w(e_{uv})T \leq a(v) \quad \forall e_{uv} \in E \quad \text{(LP5X)}$$
$$r^l(v)T \leq a(v) \quad \forall v \in V$$
$$a(v) + d(v) - (r^u(v)+1)T \leq 0 \quad \forall v \in V$$

and $$a(v) + d(v) \leq T \quad \forall v \in V \quad \text{if } a(v)+d(v) \leq T,$$

or $$a(v) + d(v) \leq a'(v) + d(v) \quad \text{if } a'(v)+d(v) > T.$$

Depending upon which is applicable, the modified constrained minimum period retiming arrival time program (LP5X) is solved with a possibly feasible clock period.

Given a solution for the modified constrained minimum period retiming arrival time program (LP5X), another solution to the modified constrained minimum period retiming arrival time program (LP5X) is computed with all arrival times being as large as possible using the Dijkstra's shortest path algorithm (cited previously). Note that the solution of the constrained minimum period retiming arrival time program (LP5) computed with all arrival times $(a'(v))_{v \in V}$ being as small as possible using the Dijkstra's shortest path algorithm is a possible solution to the modified constrained minimum period retiming arrival time program (LP5X).

A fast retiming methodology such as this for a circuit may be found in a matter of several minutes whereas a retiming to minimize the number of registers in the same circuit may take an hour or more to compute.

Retiming Beyond the Minimum Clock Period

Typically a circuit design has a critical part or critical path which determines the minimum clock period achievable by circuit retiming. Sometimes the minimum clock period achievable by circuit retiming turns out to be substantially larger than the desired target clock period. If there is such a critical part or path in a circuit design, a designer should know that it may cause problems during circuit retiming. If the retiming is to only minimize the delay of a long path, many combinational paths may have the same delay after the circuit is retimed as a result. Moreover, a retiming to additionally minimize the number of registers along the long path for the target clock period may not be useful and could also be extremely CPU intensive, causing significant delay in generating a retimed circuit.

The constrained minimum period retiming arrival time program (LP5) may be extended or the modified constrained minimum period retiming arrival time program (LP5X) may be further extended to alleviate the problems that might be caused by a critical part or a critical path in a circuit design. The extended constrained minimum period retiming arrival time program is to look for a circuit retiming in which most paths have the delay of a given target clock period $T_g$, while the minimum clock period T achievable by retiming is greater. That is $T > T_g$. An optimization problem can be formulated to achieve this.

For every gate, that is every node v∈V in the retiming graph of the circuit, a delay factor $\alpha(v)$ is introduced. A gate delay exagerator 106 may generate the delay factors $\alpha(v)$ for each gate. The delay factors $(\alpha(v))_{v \in V}$ are feasible for a clock period T and a retiming r if the retimed circuit, in which every gate v has a delay of $\alpha(v)d(v)$, can run with a clock period of T.

If the delay factors $(\alpha(v))_{v \in V}$ are feasible for a retiming r, then they provide a solution for the system of linear inequalities of linear program (LP6) which is an extension of the linear program (LP5).

$$a(u) + d(u)\alpha(u) - w(e_{uv})T \leq a(v) \quad \forall e_{uv} \in E \quad (LP6)$$
$$r^l(v)T \leq a(v) \quad \forall v \in V$$
$$a(v) + d(v)\alpha(v) - (r^u(v)+1)T \leq 0 \quad \forall v \in V$$

Note that the gate delay factors have been exagerated in the linear program LP6.

Conversely, if we have a solution for this system of linear inequalities, then the delay factors $(\alpha(v))_{v \in V}$ are feasible for the clock period T+D where $D = \max_{v \in V} d(v)\alpha(v)$ and the node retiming defined by $$r(v) := \left\lfloor \frac{a(v)}{T} \right\rfloor$$

or the rounded down value of the fraction of arrival time over the clock period.

If the value of the delay factor $\alpha(v)$ for every gate or node is at least one in the solution of the linear program (LP6), then the retimed circuit can achieve a clock period of T. Furthermore, if the value of the delay factor is at least $$\frac{T}{T_g}$$

for every gate or node in the solution of the linear program (LP6), then the retimed circuit can achieve a clock period T of $T_g + D$. A solution is sought to the linear program (LP6) in which every gate has a delay factor of at least one and in which "many" gates have a delay factor of at least the fraction $$\frac{T}{T_g}$$

which is greater than one, if the clock period T is greater than the target clock period $T_g$ or $T > T_g$.

More specifically, a solution for the system of linear inequalities of the linear program 6 (LP6) for a given clock period T in which the smallest delay factor is maximized first, then the second smallest delay factor is maximized second, then the third smallest delay factor is maximized third and so on and so forth until the largest delay factor is reached at last and maximized last. We are maximizing a progression of delay factors from the smaller delay factors to the largest delay factors in the solution in order to balance out the delays across a circuit during retiming so that in the end the number of paths with the maximum clock period (the "critical paths") is smaller. This is referred to as a balanced delay factor maximization or balanced slack factor maximization. In other words, a solution is sought in which the vector of the delay factors ordered in increasing order (smallest factor first) is as large as possible by lexicographic order.

The solution can be found by a sequence of linear programs introducing one variable for all the delay factors and maximizing the variable. A solution for which this variable is maximum has a cycle of tight inequality constraints. The value of these constraints may be fixed and then the variable can be maximized once again. The balanced slack factor maximization problem can be solved efficiently with the minimum mean balance algorithm described in "Faster Parametric Shortest Path and Minimum Balance Algorithms," by Young, Tarjan, and Orlin (cited previously).

Figure 7:
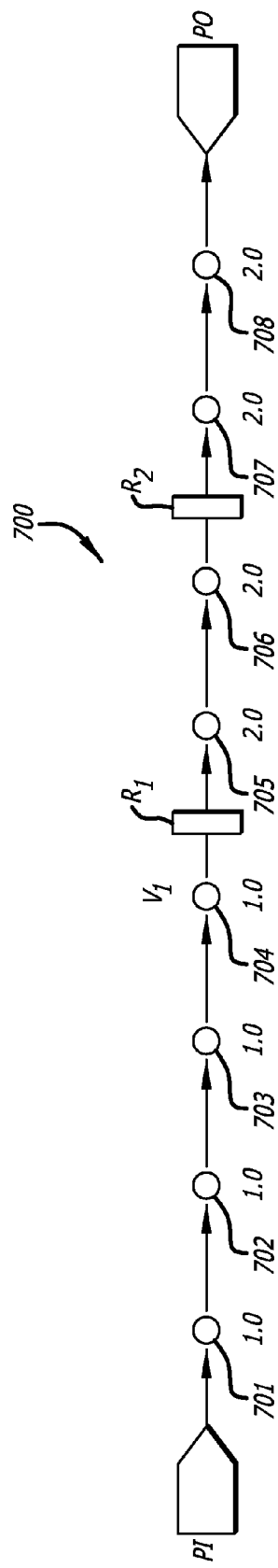
FIG. 7 is an exemplary retiming graph representing a retiming of a circuit that not only minimizes the maximum delay but also balances out the slack.

Referring now to FIG. 7, an exemplary retiming graph 700 is illustrated representing a retiming of a circuit that not only minimizes the maximum delay but also balances out the slack. The retiming graph 700 has a simple data path from a primary input (PI) to a primary output (PO) with two registers R1 and R2 coupled there-between as shown. The nodes 701-708 represent logic gates.

Assume every gate has a delay of one time unit (tu). Listed below the gates in the retiming graph 700 are the delay factors $\alpha(v)$ for each gate. The delay factor $\alpha(v)$ for nodes 701-704 is one for example. The delay factors $\alpha(v)$ for nodes 705-708 is two for example.

Assume that the node $v_1$ 704 has an upper bound of zero for its retiming value, then the register R1 following node $v_1$ 704 cannot be retimed further toward the primary input PI.

The minimum clock period which can be achieved with retiming is 4 tu. The delay factor $\alpha(v)$ has a value of one for nodes 701-704 and is maximized first. Thus, four nodes 701-704 from the primary input PI to the first register provides a delay of 4 tu equivalent to the minimum clock period. For the critical path with a delay of 4 tu, the delay factors are all 1.0, whereas for the gates following the first register R1 the delay factors are 2.0. The second register R2 is placed in the middle between the first register R1 and the primary output PO such that the edges (paths) between registers R1 and R2 and register R2 and the primary output PO have a delay of 2 tu balancing out the delay. Thus, with this circuit retiming can we realize a solution to a balanced slack factor maximization problem.

Retiming Methods

Various algorithms for performing retiming have been described herein. These algorithms may be embodied in ECAD software tools for the design of electronic circuits, particularly integrated circuits. The algorithms may also be embodied in methods or processes in the design flow of an electronic circuit.

Referring now to FIGS. 8A-8B, a flow chart of a method for retiming a circuit is illustrated. The method starts at block 801 and then goes to block 802.

At block 802, a netlist and/or layout of an initial circuit is read and an initial structure of a retiming graph may be generated in response to the netlist and any parasitics that may be extracted from the layout. The flip-flops and registers are detected and gates along data paths are assigned to nodes with routing defining edges between nodes and registers. The algorithms described previously work well with a retiming graph of a circuit.

At block 804, registers in the circuit are assigned to their respective register classes. The register class into which a register is assigned may be dependent upon the clock signals and control signals that may be coupled to the registers in the circuit.

At block 806, the gate delay for each node of the circuit is obtained. The gate delay may be read from a technology file for a cell library or it may be determined based upon a circuit simulation of one or more gates that may be assigned to a node.

At block 808, an upper bound and a lower bound of a clock period are computed for the circuit. This establishes a range of clock periods that may be used for the circuit.

At block 810, a possibly feasible clock period is selected from the range of clock periods set by the upper bound and the lower bound of the clock period.

At block 812, for each node in the circuit, signal arrival times are generated that in one case are as large as possible (ALAP) and in another case are as small as possible (ASAP) representing the largest delay and the shortest delay respectively of signals to the node.

At block 813, an upper bound and a lower bound for a respective retiming value for each node in the circuit is computed. This sets a range of retiming values for each node in the circuit. However, a retiming value for a node nearer the lower bound of the retiming value may be preferred as it minimizes backward movement over a node and simplifies the justification problem for registers with initial states (e.g., reset).

At block 814, a determination is made as to whether or not the lower bound of the retiming value for each node is greater than the upper bound of the retiming value for each respective node.

If the lower bound of the retiming value for a node is greater than the upper bound of the retiming value, then a retiming of the circuit is not feasible with the selected possibly feasible clock period and the method goes to block 811. At block 811, the lower bound of the clock period is set to be the previously selected possibly feasible clock period, which was chosen previously in block 810, and the upper and lower bounds of retiming values for the nodes are reset. The process then goes to block 810 where the process of blocks 810, 812, and 813 are iterated once again with a different possibly feasible clock period. The repeated iteration of the process of blocks 810, 812, and 813 using a new possibly feasible clock period may achieve a retiming with a feasible clock period.

If the lower bound of the retiming value for a node is less than or equal to the upper bound of the retiming value, then a retiming of the circuit is feasible with the selected possibly feasible clock period and the method goes on to block 815.

At block 815, a determination is made as to whether or not the lower bound or the upper bound for the retiming value for any node was improved due to an iterative computing process of generating arrival times and computing upper and lower bounds of retiming values for a different possible feasible clock period. An upper bound of a retiming value is improved if it is decreased. A lower bound of a retiming value is improved if it is increased.

If it was determined that a retiming will be achieved in the first instance using the currently computer upper and lower bounds of retiming values for each node, then there was no computation made that improved any bound of the retiming value and the process goes to block 818.

A better upper bound of a retiming value for a node reduces the number of forward register movements over the given node, in one embodiment of the invention. In another embodiment of the invention, a better upper bound and a better lower bound of a retiming value for a node reduce the movement of registers over a node. In yet another embodiment of the invention, a better upper bound and lower bound on the retiming value may determine that a clock period cannot be achieved by retiming.

If a repeated process of generating new arrival time values and computing upper and lower bounds of retiming values improved upon an upper or lower bound of retiming values computed previously, the process goes to block 817.

At block 817, the number of times or iterations that the process of generating new arrival time values and computing upper and lower bounds of retiming values has been performed is tested against a predetermined number. If the number of iterations is less than the predetermined number, then the process goes back to block 812 to further repeat the process of generating new arrival time values and computing upper and lower bounds of retiming values. If the number of iterations is greater than or equal to the predetermined number, then the process goes on to block 818. For example, if the predetermined number was 10, the process of generating new arrival time values 812 and computing upper and lower bounds of retiming values 813 with a different clock period may be repeated ten times if there is continuing improvement in the computation of upper and lower bounds of retiming values for an achievable retiming.

At block 818, using the computed upper and lower bounds of retiming values for each node, a retiming value is computed for each and every node of the circuit within the range of retiming values established by the upper and lower bounds in order to minimize area usage. In one embodiment of the invention, the retiming values are computed to minimize movement of the registers in a circuit and to bias forward register movement over backward register movement. The computation of retiming values to minimize area usage is further described in "Retiming Synchronous Systems" by Leiserson and Saxe previously cited and incorporated by reference as well as "Maheshwari & Sapatnekar I" which was also previously cited and incorporated by reference.

Then at block 820, a determination is made as to whether or not the retiming value for a node is equal to zero.

If the retiming value for a node is equal to zero, there is no register movement over the given node and the retiming process can move onto the next node. Thus, the process jumps to block 826.

If the retiming value of a node is nonzero, one or more registers may be moved forward or backward over the node and the process goes to block 822.

At block 822, one or more registers are moved over the node in response to the value of the retiming value for each node that is non-zero. If the retiming value is negative, one or more different registers may be moved forward over the node. If the retiming value is positive, one or more different registers may be moved backward over the node. More detail of the process of register movement 822 over a node is shown and described with reference to FIG. 8B.

Referring now to FIG. 8B, the process of register movement starts at block 822 and jumps to block 830.

At block 830, register movement of registers in the same class are moved together over the nodes. Certain types of registers in the register classes may not be moveable over the nodes in the circuit. This may particularly be the case, if the initialization of the register cannot be resolved within the circuit with the given clocking and control signals.

At block 832, a determination is made if the retime value for a given node is negative or less than zero. If the retime value is negative, then the process goes to block 844. If the retime value is not negative and it was previously determined to be nonzero, then the retime value is positive and the process goes to block 834.

At block 834 with the retime value being positive, a determination is made if the number of fan-in edges coupled into the node is greater than one. If so then each register moving backward over the node is to be duplicated along the data path of the edges coupled into the node. Thus, if the fan-in of the node is one, then the process goes to block 838 skipping block 836. However, if the fan-in of the given node is greater than one, then the process goes to block 836.

At block 836 with a fan-in greater than one, each differing register in front of the node that is to move backwards over the node is replicated for placement along the fan-in edges coupled into the node. Then the process can go to block 838.

At block 838 in response to the retime value of the node being positive, a retime value number of registers in front of the node may be moved backward over the node to one or more fan-in edges. The process then goes to block 840.

At block 844 with the retime value being negative and not positive, a determination is made if the number of fan-out edges coupled to the node is greater than one. If so then each register moving forward over the node is to be duplicated along the data path of the edges coupled out from the node. Thus, if the fan-out of the node is one, then the process goes to block 848 skipping block 846. However, if the fan-out of the given node is greater than one, then the process goes to block 846.

At block 846 with a fan-out greater than one, each differing register behind the node that is to move forwards over the node is replicated for placement along the edges coupled out of the node. Then, the process can go to block 838.

At block 848 in response to the retime value of the node being negative, a retime value number of registers behind the node may be moved forward over the node to one or more fan-out edges. The process then goes to block 840.

At block 840, regardless of whether a register is moved forward or backward over a node, the clock and control signals and control logic generating the clock and control signals may be adjusted to provide the correct initialization for the register being moved. In some cases, this adjustment process may be best left toward the end of the retiming process, such as at block 828 illustrated in FIG. 8A.

At block 842, a determination is made as to whether all register classes with registers to move have been considered. If so the process goes to block 869. If not all register classes have been considered so that some registers still need to be retimed, the process goes to block 850 where the next register class is selected for retiming.

At block 869, the process goes to block 824 returning to the flowchart of FIG. 8A.

Referring now back to FIG. 8A, at block 824 a determination is made if all nodes in the circuit have been address and all registers have been moved in the netlist and/or layout to retime the circuit. If not, the process goes to block 826 where the next node that has yet to be retimed is selected for processing. If all nodes of the circuit have been considered, the process goes to block 828.

At block 828 after the registers have been moved to complete the circuit, the logic and control signals to provide the proper initialization settings to the registers may be made as needed. After the proper initialization settings for the moved registers has been finalized, the retiming process may go to block 899 and end.

Computer System

Figure 9:
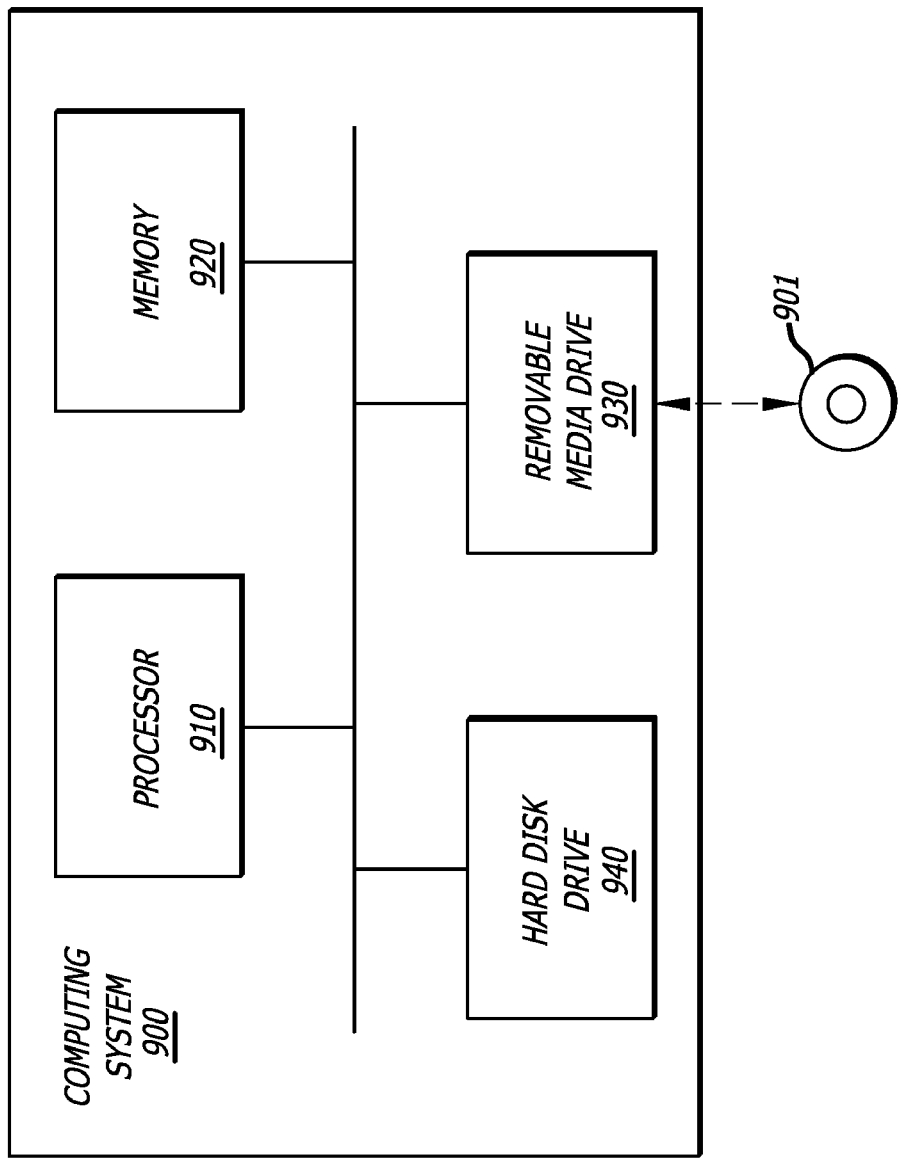
FIG. 9 illustrates an exemplary computing system that may be used to perform some or all of the processes in accordance with a number of embodiments of the invention.

Referring now to FIG. 9, an exemplary computing system 900 is illustrated that may be used to perform some or all of the processes in accordance with a number of embodiments of the invention. In one embodiment of the invention, the computing system 900 includes a processor 910, a memory 920, a removable media drive 930, and a hard disk drive 940. In one embodiment, the processor 910 executes instructions residing on a machine-readable medium, such as the hard disk drive 940, a removable medium (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 920, which may include Random Access Memory (RAM), dynamic RAM (DRAM), etc. The processor 910 may retrieve the instructions from the memory 920 and execute the instructions to perform the operations described above.

Note that any or all of the components and the associated hardware illustrated in FIG. 9 may be used in various embodiments of the system 900. However, it should be appreciated that other configurations of the system 900 may include more or less devices than those shown in FIG. 9.

Some portions of the preceding detailed description may have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for automatically performing the operations described herein. This apparatus may be specially constructed for the required purposes, or it may comprise a general-purpose computer selectively activated or reconfigured by a computer program stored in the computer. When implemented in software, the elements of the embodiments of the invention are the code segments to automatically perform an operation. The program or code segments can be stored in a machine-readable medium, computer-readable storage medium, processor-readable medium or transmitted by a computer data signal embodied in a carrier wave over a transmission medium or communication link. The "processor readable medium" may include any medium that can store or transfer information. Examples of the processor readable medium include but are not limited to an electronic circuit, a semiconductor memory device, a read only memory (ROM), a random access memory (RAM), a flash memory, an erasable programmable read only memory (EPROM), a floppy diskette, a CD-ROM, optical storage media such as an optical disk, or magnetic disk storage media such as a hard disk, etc, or any other type of media suitable for storing electronic instructions which can be coupled to a processor, machine, or computer such as through a computer system bus. The code segments may be downloaded into the processor readable medium via computer networks such as the Internet, Intranet, etc.

The processes presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention are not described with reference to any particular programming language. It will be appreciated that a variety of programming languages may be used to implement the teachings of the invention as described herein.

CONCLUSION

A constrained minimum period retiming arrival time program is disclosed incorporating constraints on retiming values of gates for computing a lower and upper bound on the clock period achievable by retiming. This speeds up the binary search for the minimum clock period which can be realized by retiming. Moreover, the constrained minimum period retiming arrival time program is based upon retiming graphs formulated from netlists so that the number of edges is reduced to lower the number of computations.

Efficient computation of lower and upper bounds for the retiming values is disclosed for the constrained minimum period retiming problem. The bounds on the retiming values can be used to further bound the retiming values to either determine that a clock period cannot be realized by retiming or to reduce the number of variables and constraints in the network flow formulation.

When a circuit retiming is realized by moving registers, new initial states for each are computed. This may not always be possible when registers are moved backward. In such a case, a new upper bound on the corresponding node may be introduced and the retiming problem can be solved again, which is further described in Eckl cited previously.

The lower bound on the retiming values and the initial solution to the retiming values for each node can be computed very efficiently. It is desirable to generate good lower and upper bounds on the clock period in order to limit the search for a feasible clock period and reduce the testing to determine if a clock period is feasible or not. Moreover, the retiming values may be further constrained to reduce the complexity of the clock period feasibility test and the minimum area optimization.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Rather, the embodiments of the invention should be construed according to the claims that follow below.

What is claimed is:

1. A method of retiming a circuit, the method comprising:
with a processor performing at least one of
computing an upper bound and a lower bound for a clock period of a clock signal in response to a netlist of a circuit, wherein the clock signal clocks the circuit;
selecting a potential clock period for the clock signal to clock registers of the circuit in response to the computed upper bound and the computed lower bound for the clock period;
generating a largest arrival time and a smallest arrival time of input signals for each node of the circuit;
computing an upper bound and a lower bound of a retiming value for each node of the circuit, wherein the computed upper bound and lower bound of a retiming value for each node determines if a retiming of the circuit is achievable with the potential clock period; and
computing the retiming value for each node of the circuit to minimize circuit area in response to the computed upper and lower bounds of the retiming value and the largest and smallest arrival times for input signals for each node.

2. The method of claim 1, further comprising:
moving one or more registers in the netlist over nodes with a non-zero retiming value to retime the circuit.

3. The method of claim 2, further comprising:
prior to moving the one or more registers in the netlist,
assigning each register to one of a plurality of differing register classes in response to the clock and control signals coupled to each register, and
wherein the one or more registers in the netlist are coincidentally moved together in the netlist in response to being in the same register class.

4. The method of claim 2, wherein
if the computed retiming value is less than zero for a node, the number of registers moved forward over the node is equal to the magnitude of the computed retiming value.

5. The method of claim 2, wherein
if the computed retiming value is greater than zero for a node, the number of registers moved backward over the node is equal to the computed retiming value.

6. The method of claim 2, further comprising:
adjusting the initialization settings of the one or more registers moved in the netlist in response to their initial position and the clock and control signals initially coupled to the one or more registers.

7. The method of claim 1, further comprising:
forming a retiming graph of the circuit including nodes representing logic gates and registers coupled together by edges in response to the netlist of the circuit; and
wherein the computing, generating, and moving is responsive to the retiming graph.

8. The method of claim 1, further comprising:
prior to the computing of the retiming value for each node,
determining if the computed lower bound of the retiming value is greater than the computed upper bound of the retiming value for any node and if so then,
selecting a different potential clock period in response to the computed upper bound and the computed lower bound of the clock period, and
repeating the computing of the upper and lower bounds of the retiming value for each node of the circuit.

9. The method of claim 8, wherein
the different potential clock period is the computed lower bound of the clock period.

10. The method of claim 1, further comprising:
prior to computing the upper bound and the lower bound of the clock period,
determining a gate delay for each node of the circuit in response to the netlist and a cell library of gates to be instantiated in the circuit, and
wherein the computing of the upper bound and the lower bound of the clock period is responsive to the netlist and the gate delay of each node of the circuit.

11. The method of claim 1, wherein
the potential clock period is selected to try to minimize the clock period of the clock signal and achieve a retiming of the circuit.

12. The method of claim 1, wherein
the potential clock period is selected to be the lower bound of the clock period.

13. The method of claim 1, wherein
the upper bound and the lower bound of the retiming value are computed by finding a solution to a plurality of inequalities.

14. A method of retiming a circuit, the method comprising:
with a processor performing at least one of
computing an upper bound and a lower bound for a clock period of a clock signal in response to a netlist of a circuit, wherein the clock signal to clock the circuit;
selecting a potential clock period for the clock signal to clock registers of the circuit in response to the computed upper bound and the computed lower bound for the clock period;
computing an upper bound and a lower bound of a retiming value for each node of the circuit, wherein the computed upper bound and lower bound of a retiming value for each node determines if a retiming of the circuit is achievable with the potential clock period;
computing the retiming value for each node of the circuit to minimize circuit area in response to the computed upper bound and lower bound of a retiming value for each node; and
balancing out gate delays across the circuit so that the number of critical paths of the retimed circuit is reduced.

15. The method of claim 14, wherein
the gate delays are balanced out across the circuit by exaggerating the delay of each gate by a delay factor greater than or equal to one.

16. The method of claim 15, wherein
the delay factor for a substantial number of gates of the circuit is greater than or equal to the ratio of the minimum clock period to the target clock period.

17. An apparatus for designing a circuit, the apparatus comprising:
a retimer to retime a circuit design with minimal forward register retiming, the retimer to retime the circuit design in response to a target clock period of a clock signal, gate delays of gates instantiated in the circuit design, and upper and lower bounds of retiming values for the gates in the circuit design, wherein the clock signal to clock the circuit design, the retimer further to
compute an upper bound and a lower bound for the target clock period in response to a netlist of the circuit;
generate a largest arrival time and a smallest arrival time of input signals for each node of the circuit;
compute an upper bound and lower bound of a retiming value for each gate of the circuit, wherein the computed upper bound and lower bound of a retiming value for each gate determines if a retiming of the circuit is achievable with the target clock period; and
compute the retiming value for each node of the circuit to minimize circuit area in response to the computed upper bound and lower bound of a retiming value and the largest and smallest arrival times for input signals for each node.

18. The apparatus of claim 17, wherein
the retimer further to
select the target clock period in response to the computed upper bound and the computed lower bound for the target clock period.

19. The apparatus of claim 17, wherein
the retimer includes a gate delay exaggerator to associate delay factors to each gate in the circuit design.

20. The apparatus of claim 17, further comprising:
a mapper coupled to the retimer, the mapper to map a high level description of the circuit into the netlist in response to the target clock period and cells of a cell library; and
a re-mapper coupled to the retimer, the re-mapper to remap the netlist to generate a retimed netlist in response to the computed retiming values for each gate of the netlist.

21. The apparatus of claim 17, further comprising:
a placer coupled to the retimer, the placer to incrementally place cells into a layout of an integrated circuit design in response to the netlist; and
a logic optimizer coupled to the retimer, the logic optimizer to incrementally optimize the layout in response to a retimed netlist.

22. The apparatus of claim 21, wherein
the logic optimizer adds a buffer to the layout to preserve functionality of the circuit and balance out gate delays.

23. The apparatus of claim 22, wherein
the logic optimizer adjusts the size and strength of the buffer in the layout to balance the gate delays.

24. A machine-readable product for designing circuits comprising:
a non-transitory machine readable medium having stored therein
machine readable program code to automatically compute an upper bound and a lower bound for a clock period of a clock signal to clock a circuit in response to a netlist of the circuit;
machine readable program code to automatically select a potential clock period for the clock signal to clock registers of the circuit in response to the computed upper bound and the computed lower bound for the clock period;
machine readable program code to automatically compute an upper bound and a lower bound of a retiming value for each node of the circuit, wherein the computed upper bound and lower bound of a retiming value for each node determines if a retiming of the circuit is achievable with the potential clock period; and machine readable program code to automatically compute the retiming value for each node of the circuit to minimize circuit area in response to the computed upper bound and lower bound of a retiming value for each node; and machine readable program code to automatically balance out gate delays across the circuit so that the number of critical paths of the retimed circuit is reduced.

25. The machine-readable product of claim 24, wherein the gate delays are balanced out across the circuit by exaggerating the delay of each gate by a delay factor greater than or equal to one.

26. The machine-readable product of claim 25, wherein the delay factor for a substantial number of gates of the circuit is greater than or equal to the ratio of the minimum clock period to the target clock period.

27. The machine-readable product of claim 24, wherein the non-transitory machine readable medium further has stored therein machine readable program code to automatically generate a largest arrival time and a smallest arrival time of input signals for each node of the circuit.

* * * * *